(12) United States Patent
Keil et al.

(10) Patent No.: US 7,596,505 B2
(45) Date of Patent: *Sep. 29, 2009

(54) SYSTEM TO QUANTIFY CONSUMER PREFERENCES

(75) Inventors: Sev K. H. Keil, Anif (AT); Dick R. Wittink, North Haven, CT (US); Hiek Roelof van der Scheer, Rossum (NL)

(73) Assignee: True Choice Solutions, Inc., New York, NY (US)

( * ) Notice: Subject to any disclaimer, the term of this patent is extended or adjusted under 35 U.S.C. 154(b) by 536 days.

This patent is subject to a terminal disclaimer.

(21) Appl. No.: 10/635,387

(22) Filed: Aug. 6, 2003

(65) Prior Publication Data

US 2006/0026081 A1 Feb. 2, 2006

Related U.S. Application Data

(60) Provisional application No. 60/401,266, filed on Aug. 6, 2002.

(51) Int. Cl.
G06F 17/30 (2006.01)
G07G 1/00 (2006.01)

(52) U.S. Cl. ..................................... 705/10
(58) Field of Classification Search .............. 705/10
See application file for complete search history.

(56) References Cited

U.S. PATENT DOCUMENTS

| | | | |
|---|---|---|---|
| 5,041,972 A | 8/1991 | Frost | |
| 5,124,911 A | 6/1992 | Sack | |
| 5,583,763 A | 12/1996 | Atcheson et al. | |
| 5,974,396 A | 10/1999 | Anderson et al. | |
| 6,012,051 A | 1/2000 | Sammon et al. | |
| 6,029,195 A | 2/2000 | Herz | |
| 6,134,532 A | 10/2000 | Lazarus et al. | |
| 6,208,989 B1 | 3/2001 | Docketer et al. | |
| 6,236,975 B1 | 5/2001 | Boe et al. | |
| 6,236,978 B1 | 5/2001 | Tuzhilin | |
| 6,298,348 B1 | 10/2001 | Eldering | |
| 6,321,221 B1 | 11/2001 | Bieganski | |
| 6,826,541 B1* | 11/2004 | Johnston et al. | 705/36 R |
| 2002/0026390 A1 | 2/2002 | Ulenas et al. | |
| 2002/0065721 A1* | 5/2002 | Lema et al. | 705/14 |
| 2002/0087388 A1* | 7/2002 | Keil et al. | 705/10 |

OTHER PUBLICATIONS

MCCullough, Dick. "Trade Off Analysis." Macro Consulting, Inc. Mar. 3, 2000. Jun. 25, 2008 <www.macroinc.com> retrieved from http://web.archive.org.*

(Continued)

*Primary Examiner*—Andre Boyce
*Assistant Examiner*—Folashade Anderson
(74) *Attorney, Agent, or Firm*—Fish & Richardson P.C.

(57) ABSTRACT

A user interface includes a plurality of selectable graphical elements, each of the graphical elements representing a respective attribute level of a product attribute, a first area for presenting at least one of the plurality of selectable graphical elements that has been designated by a respondent as representing an unacceptable attribute level, a second area for presenting one of the plurality of selectable graphical elements that has been designated by the respondent as representing a least-preferred attribute level, and a third area for presenting one of the plurality of selectable graphical elements that has been designated by the respondent as representing a most-preferred attribute level.

18 Claims, 13 Drawing Sheets

OTHER PUBLICATIONS

Active Sales Assistant © 2001 Active Decisions, Inc., Jun. 2001. 12pgs.

"Active Buyer's Guide:Dogs", Copyright © 2002 Active Decisions Inc., download from http://www9.activebuyerguide.com/abg/nav/ on Jul. 26, 2002. 10pgs.

"The ACA/HB Module for Hierarchical Bayes Estimation", *Sawhooth Software, Inc.* (Aug. 1999).

Magidson, Jay, and Vermunt, Jeroen K., "Latent Class Models".

"The CBC Latent Class Technical", *Copyright 2000, Sawtooth Software, Inc.*

Acatech, "Adaptive Conjoint Analysis" (Version 4), *Copyright Sawtooth Software, Inc.* (Apr. 1993).

McCullough, Dick, "Trade-off Analysis", *A Surv ey of Commercially Available Techniques*.

Srinivasan, V. and Su Park, Chan "Surprising Robustness of the Self-Explicated Approach to Customer Preference Structure Measurement," *Journal of Marketing Research*, vol. XXXI/v (May 1997), 286-291.

Wittink, Dick R. and Keil, Sev K. "Continuous Conjoint Analysis".

Huber, Joel, "What We have Learned from 20 Years of Conjoint Research": *When to use Self-Explicated, Graded Pairs, Full Profiles or Choice Experiments.*

2001 Conference Presentations Set (Spring 2001), *Sawtooth Solutions*.

Orma, Bryan "Helping Managers Understand the Value of Conjoint", *Copyright, Sawtooth Software, 1996*.

Pinnell, Jon and Olsen, Pam "Using Choice-Based Conjoint to Assess Brand Strength and Price Sensitivity", *Copyright 1996, Sawtooth Software*.

Pinnell, Jon (1994) "Multistage Conjoint Methods to Measure Price Sensitivity".

Dawson, Neal V. (91-94) "A Model of Patients' Preferences in Serious Illness", http://www.abcpr.gov/clinic/medteprp/list8.htm, (Download date Mar. 30, 2001).

Marketswitch: "Our Industry", http://www.marketswitch.com/products/industry.html, (Download dated Apr. 11, 2001).

Kanninen, Barbara, K. (Jan. 1, 2000-Jun. 30, 2002) "Optimal Experimental Design for Nonmarket Choice Experiments", http://www.espa.com/ncerga_abstracts/grants/99/deci/kanninen.html, (Download dated Apr. 11, 2001).

Rollins, Kimberly and Beckett, Alexandria, "Using a Random Utility Model to Measure Willingness to Pay for Public Attributes of Green Goods: Implications for Market Provision of Environmental Quality", *International Institute of Fisheries Economics and Trade, Microbehavior and Macroresults IIFET 2000*, http://ors.edu/Dept/IIFET/2000/abstracts/rollings.html (Download date Apr. 11, 2001).

Ardila, Sergio, Quiroga, Ricardo and Vaughan, William J. (12/98m ENV-126, E) Publications "A Review of the Use of Contingent Valuation Methods in Project Analysis at the Inter-American Development Bank", http://www.iadb.org/sds/publication/publication_178_e.htm (Download date Apr. 11, 2001).

Understanding Market Segmentation, Technical Paper From DDS Research, httop://www.dssearch.com/marketsegment/Library/Segment/understanding.asp.

Tyner, Mary Jane and Weiner, Jonathan—MACRO—"Optimal Pricing Strategies Through Conjoint Analysis", http://www.macroinc.com/html/art/s_opt.html (Download date Apr. 10, 2001).

"Customer Targeting Models", *Opti-Market Consulting*, http://www.opti-market.com/targeting.htm (Download date Apr. 10, 2001).

Johnson, Chad, Methodologies and Capabilities: "Market stimulation software becomes smarter all the time", *Answers Research, Inc.* http://answersresearch.com/methodlogies/article5.html (Download Apr. 10, 2001).

Market Research Application Example, "Conjoint Analysis: *The Presure*", Statistics & Operations Research, http://www.sas.com/rnd/app/da/market/mraexsim.html (Download date Apr. 10, 2001).

"Research Triangle Institute: Conjoint Analysis Software Tools", http://www.rti.org/difference/conjoint_tools.cfm (Download date Apr. 10, 2001).

Decision Support Inc., A Full Service Market Research & Consulting Firm, "Services Offered" http://www.decisionsupportinc.com/services.html (Download date Apr. 10, 2001).

Landsend.com, "My Personal Shopper: Like having a personal wardrobe" http://www.landend.com/vpsEntry.cgi?mode=GRAPHIC &refer=c.../&sid=098702323344 (Download date Apr. 11, 2001).

Direct1.com "About Direct1" http://direct1.com/company/whatdowedo.html (Download date Apr. 3, 2001).

Discretechoice.com "White Paper: Sample Discrete Choice Analysis", http://www.discretechoice.com/analysis.html (Download date Jan. 2, 2001).

Minetheme Knowledge Bank "Information: that Inspires". http://www.mindtheme.com/knowledge/trst.asp (Download Apr. 10, 2001).

Dominator 2000™ Market Stimulation Model From DSS Research, Dominator 2000™ http://dssresearch.com/library/Dominator/dominator.asp (Download date Apr. 10, 2001).

Conjoint Analysis Tools, http:www.whitehorse.com.au/~prosoft/statist.htm (Download date Feb. 14, 2001).

Johnson, Richard M., Sawtooth Technologies: "Trade-Off Analysis of Consumer Values" reprinted from *Journal of Marketing Research*, published by the American Marketing Association, vol. 11 (May 1974), pp. 121-127, http://www.sawtooth.com/news/library/articles/johnson.htm (Download Feb. 14, 2001).

McCullough, Dick "The Cake Method: A Proprietary Hybrid Conjoint Approach", Macro Consulting, Inc. http://www.macroinc.com/html/art/s_cak.html (Download date Dec. 6, 2000).

ACA, "Adaptive Conjoint Analysis", http://www.sawtoothsoftware.com/ACA.htm (Download date Nov. 30, 2000).

Analysis: Conjoint Case Example From DSS Research—Marketing Research For . . . , http://www.dssresearch.com/conjoint/CaseExample/Analysis.asp (Download date Apr. 2, 2001).

A Reviw of Conjoint Analysis, Technical Paper From DSS Research: "Understanding Conjoint Analysis", http://www/dssresearch.com/conjoint/Library/Conjoint/conjoint.asp (Download date Apr. 2, 2001).

Novak, Tom "Online Exercises: Design Your Own Movie Theater Using Conjoint Analysis", Interactive Exercises, http://www2000.ogsm.vanderbilt.edu/novak/conjoint-Movies/ (Download date Apr. 11, 2001).

Mangen Research Associates, Inc., (1999) "Introduction to Conjoint Analysis", http://www.mraic.com/conj_intro.html (Download date Feb. 14, 2001).

Sawtooth Software, "Conjoint Analysis: ACA Description", http://www.sawtoothsoftware.com/aca.shtml (Download date Feb. 14, 2001).

Mangen Research Associates, Inc. (1999) "Correlation of Estimates—Conjoint Analysis", http://www.mrainc.com/estimate_conj.html (Download date Jan. 2, 2001).

Online Insight—Thanks for your time, file://D:\StarteHere.html (Download date Dec. 18, 2000).

Bajaj, Akhilesh. "Factors Relevant to Senior Information Systems Managers' Decisions to Adopt New Computing Paradigms: An Exploratory Study," 1998 [retrieved from Internet: http://lost-contact.mit.edu/afs/net/project/afd32/andrew.cmu.edu/supa/wpapers/1998].

Kislinger, Gunter. "Die Anwendung des Teilnutzenwertmodells in der Marktsegmenticrung," Karl-Franzens-Universitaet Graz (Austria), 1990 [retrieved from Proquest].

Lau, Kin-nam. "Evaluating Consumer Preferences for Existing Multiattribute Products: A Non-Metric Approach," College of Business Administration, North Dakota State University, 1993 [retrieved from Internet].

Bajaj, Akhilesh, "A Study of Senior Information Systems Managers' Decision Models in Adopting New Computing Architectures", Journal of the Association for Information Systems, Jun. 2000 [retrieved from Internet].

Reibstein et al. "Conjoint Analysis Reliability: Empirical Findings," Marketing Science, Summer 1988 [retrieved from JSTOR].

Green et al. "Conjoint Analysis in Consumer Research: Issues and Outlook," The Journal of Consumer Research, Sep. 1978 [retrieved from JSTOR].

Desarbo et al. "Three-Way Multivariate Conjoint Analysis," Marketing Science, Autumn 1982 [retrieved from JSTOR].

Griffin et al. "The Voice of the Customer," Marketing Science, Winter 1993 [retrieved from JSTOR].

P.E Green, V. Srinivasan, "Conjoint analysis in marketing: new developments with implications for research and practice", The Journal of Marketing, 1990.

Proceedings of the 2000 Sawtooth Software Conference, Sequim Washington, pp. 1-268.

Paul E. Green and Abba M. Krieger, "Individualized Hybrid Models for Conjoint Analysis", Management Science, vol. 42, No. 6 (Jun. 1996), pp. 850-857.

Paul E. Green, Abba M. Krieger and Manoj. K. Agrawal, "A Cross validation test of our models for quantifying multiattribute preferences" Marketing Letters, Publisher Springer Netherlands, ISSN 0923-0645 (Print) 1573-059X (Online), Issue vol. 4, No. 4 / Oct. 1993.

René Y. Darmona and Dominque Rouzies, Internal Validity of Conjoint Analysis Under Alternative Measurement Procedures, vol. 46, Issue 1, Sep. 1999, pp. 67-81.

B. Ome, WC King, "Conducting full-profile conjoint analysis over the internet", accessed May 1998—business.nmsu.edu.

A Review of Conjoint Analysis, Jul. 1998 [retrieved from http://dssresearch.com/library/conjoint/conjoint.htm].

Cattin et al. "Commercial Use of Conjoint Analysis: A Survey," Journal of Marketing, Summer 1982 [retrieved from Dialog].

Green et al. "New Techniques for Measuring Consumers' Judgements of Products and Services," Sep. 1974 [retrieved from Internet].

"Active Buyers Guide", Active Decisions, Inc. (2002).

"Active Sales Assistant", Active Decisions, Inc. (2001).

"eBranding Study: Oneline Insight & Accenture—What is Conjoint?", http://ww.onlineinsight.com/ebranding/conjoint.html], (Apr. 27, 2001).

Paul, Larren, "1 to 1 Marketer" [www.1to1.com/Building/Customer-Relatinships/entry.jsp?REQUESTED_URL], (May 31, 2001).

Office Action issued in U.S. Appl. No. 09/754,612 mailed Nov. 3, 2004, 12 pages.

Office Action issued in U.S. Appl. No. 09/754,612 mailed Dec. 15, 2005, 12 pages.

Office Action issued in U.S. Appl. No. 09/754,612 mailed Oct. 18, 2006, 15 pages.

Office Action issued in U.S. Appl. No. 09/754,612 mailed Jul. 9, 2008, 19 pages.

Office Action issued in U.S. Appl. No. 09/754,612 mailed Apr. 2, 2009, 12 pages.

* cited by examiner

| CLIENT: ACME SKIS ; PRODUCT: DOWNHILL SKIS | | | 502 |
|---|---|---|---|
| ATTRIBUTE 504 | ATTRIBUTE LEVELS 506 | IMPLICIT ORDER 508 | UNACCEPTABLE LEVELS ALLOWED? 510 |
| BRAND | ROSSIGNOL, VOLKL, ATOMIC, SOLOMON | NO | NO |
| PRICE | $300, $400, $500, $600 | YES | YES |
| LENGTH | 160cm, 170cm, 183cm, 188cm, 200cm | NO | YES |
| TYPE | BEGINNER/INTERMEDIATE, ALL-MOUNTAIN, GS, SLALOM, POWDER | NO | YES |
| WARRANTY | NO WARRANTY, 2 YEAR WARRANTY | YES | NO |

FIG. 5

RESPONDENT: JOHN PUBLIC ; PRODUCT: DOWNHILL SKIS 296 602

| ATTRIBUTE 604 | ATTRIBUTE LEVEL/ASSOCIATED PART WORTH VALUE 606 |
|---|---|
| BRAND | ROSSIGNOL/10, VOLKL/X, ATOMIC/7, SOLOMON/0 |
| PRICE | $300/5, $400/4.5, $500/1, $600/0 |
| LENGTH | 160cm/1.4, 170cm/2.8, 183cm/7, 188cm/5.6, 200cm/0 |
| TYPE | BEGINNER/INTERMEDIATE/X, ALL-MOUNTAIN/4.8, GS/8, SLALOM/0, POWDER/5.6 |
| WARRANTY | No Warranty/0, 2 Year Warranty/2 |

FIG. 6

| RESPONDENT: JOHN PUBLIC | PRODUCT: DOWNHILL SKIS | | DATA COLLECTED: 12/12/02, 5:23 PM | |
|---|---|---|---|---|
| ATTRIBUTE | ATTRIBUTE LEVEL/ASSOCIATED PART WORTH VALUE | | | |
| BRAND | ROSSIGNOL UTILITY = 10 | VOLKL UTILITY = X | ATOMIC UTILITY = 7 | SOLOMON UTILITY = 0 |
| PRICE | $300 UTILITY = 5 | $400 UTILITY = 4.5 | $500 UTILITY = 1 | $600 UTILITY = 0 |
| LENGTH | 160cm UTILITY = 1.4 | 170cm UTILITY = 2.8 | 183cm UTILITY = 7 | 188cm UTILITY = 5.6 | 200cm UTILITY = 0 |
| TYPE | BEGINNER/ INTERMEDIATE UTILITY = X | ALL-MOUNTAIN UTILITY = 4.8 | GS UTILITY = 8 | SLALOM UTILITY = 0 | POWDER UTILITY = 5.6 |
| WARRANTY | NO WARRANTY UTILITY = 0 | 2 YEAR WARRANTY UTILITY = 0 | | | |

EACH "X" REPRESENTS A PART WORTH VALUE THAT IS UNKNOWN BECAUSE AN ASSOCIATED ATTRIBUTE LEVEL IS UNACCEPTABLE TO THE RESPONDENT

FIG. 12

SYSTEM TO QUANTIFY CONSUMER PREFERENCES

CROSS-REFERENCE TO RELATED APPLICATIONS

This application claims priority to Provisional Application Ser. No. 60/401,266, filed Aug. 6, 2002 and entitled "System to Quantify Consumer Preferences".

This application is related to co-pending U.S. patent application Ser. No. 09/754,612, filed Jan. 4, 2001 and entitled "System to Quantify Consumer Preferences".

BACKGROUND

1. Field

The present invention relates to systems for determining consumer preferences. More specifically, the invention relates to self-explicated trade-off analysis systems used to quantify preferences of a respondent with respect to product attributes and to product attribute levels.

2. Discussion

Manufacturers are presented with many choices during the design of a product. For example, a manufacturer must choose from among several available product features, or attributes, when deciding which attributes to include in a product. Some attributes are optional while others must be included. In the case of a television set, "Chassis color" is an attribute that must be included and "Picture-in-picture" is an optional attribute. For each included attribute, a manufacturer must also choose an attribute level to associate with the attribute. Examples of attribute levels which may be associated with the attribute "Chassis color" include "black", "white", "blue", etc.

Occasionally, a manufacturer produces several versions of a similar product by varying product attributes and/or attribute levels among the several versions. In such a case, the manufacturer must determine attributes and associated attribute levels to include in each version as described above. Moreover, the manufacturer must determine how many units of each version will be produced. For example, a manufacturer choosing to produce televisions having a black chassis and televisions having a blue chassis must also determine how many of each type of television to produce and offer for sale.

Product pricing represents a further choice for product manufacturers. In this regard, a manufacturer attempts to choose a price for each produced product that will maximize overall profit to the manufacturer. Of course, price may also be considered a product attribute, with associated attribute levels consisting of particular prices.

Each of the foregoing choices, as well as other choices, may be greatly facilitated if the manufacturer has detailed and accurate information relating to consumer preferences. A consumer, in this regard, is any entity to which a product (i.e. a good and/or service) may be offered. Such consumers include individuals, businesses, and purchasing managers. Consumer preference information can be used to determine the popularity and desirability of particular product attributes and attribute levels to consumers. Therefore, by using this information, a manufacturer is more likely to choose product configurations as well as production amounts and prices for each product configuration that maximize overall profit.

In view of its importance, manufacturers expend significant resources in their attempts to obtain detailed and accurate consumer preference information and to analyze marketplace choices. These resources are most commonly allotted to conventional consumer surveys. Such surveys typically consist of a list of predetermined questions designed to elicit information from a respondent regarding the respondent's feelings toward products, product attributes, and product attribute levels. Surveys may be administered randomly, for example by stopping respondents at shopping malls or other retail areas, or by contacting specific respondents who are targeted because they are members of a demographic group about which information is desired.

Conventional surveys present several inherent drawbacks. First, since survey results are compiled into general demographic categories, surveys merely determine, at best, preferences of a theoretical average consumer belonging to each demographic category. Accordingly, survey results are only marginally correlated to any one respondent's preferences. Therefore, such results lack predictive precision of a particular respondent's preferences with respect to marketplace choices that are available and not yet available. Second, although conventional surveys may indicate whether one attribute level (e.g. "black chassis color") is generally preferred over another attribute level of the same attribute ("white chassis color"), such surveys do not provide any reliable means for comparing preferences across attributes. For example, conventional surveys are generally unable to determine the degree to which a respondent prefers a black chassis to another color so as to enable comparison between that degree and the degree to which the respondent prefers a 27" screen to another screen size. As a result of these drawbacks, conventional surveys are poor at producing useful quantified preference information of individual respondents.

Focus groups are another conventional vehicle used to obtain preference information. In a typical focus group, certain respondents are randomly selected (or selected based on demographics as described above) to answer questions and/or to participate in a group discussion regarding a product or a type of product. Answers and comments put forth by the respondents are noted and tabulated to create preference information similar to that obtained using survey techniques. However, because of their interactive nature, focus groups may elicit information which is more pertinent than that elicited by surveys. Despite this possible advantage, focus groups still suffer from the drawbacks described above with respect to conventional surveys.

The field of trade-off analysis was developed to address the above and other shortcomings in conventional techniques for determining preference information. Generally, trade-off analysis techniques attempt to quantify a respondent's preference for a particular product's attributes and attribute levels. Such quantification is intended to allow a manufacturer to easily and accurately compare the attractiveness of various product configurations to a respondent. For example, many trade-off analysis techniques allow a manufacturer to compare the attractiveness of a 27" television with Picture-in-picture capability priced at $399 with that of a 35" television with a digital comb filter priced at $599. This comparison is possible because the techniques associate a particular numerical value with a respondent's preference for each attribute and attribute level. Accordingly, the relative attractiveness of any attribute or attribute level with respect to any other attribute or attribute level can often be determined simply by comparing the appropriate associated numerical values.

According to one classification scheme, four types of trade-off analysis techniques exist: conjoint; discrete choice; self-explicated; and hybrid. Conjoint analysis generally requires a respondent to rate or rank product configurations with respect to one another. Typically, the consumer is asked to evaluate twenty to thirty product configurations. Each configuration includes different combinations of attributes and attribute levels being evaluated. By appropriately varying the configurations, a regression model can be estimated for each respondent in order to estimate respondent-specific numerical values for the attribute levels.

Conjoint analysis is an improvement over conventional systems for determining preference information. For example, determining preferences by observing respondent behavior is difficult or impossible because respondent behavior can usually be observed only with respect to a few combinations of attributes and attribute levels (i.e., the combinations that exist in the marketplace). Accordingly, it becomes difficult to separate and distinguish between the preferences of different consumers and to predict effects of changes in attributes and/or attribute levels on respondent behavior. On the other hand, conjoint analysis allows for improved learning of respondent preferences through controlled variation and controlled co-variation of attributes and attribute levels.

According to discrete choice analysis, a respondent is presented with a set of product configurations and asked to select either the configuration that the respondent is most interested in purchasing or no configuration if the respondent is not interested in purchasing any of the presented configurations. The process is then repeated for other sets of product configurations. In contrast to conjoint analysis, which may be used to estimate a regression model for individual respondents, discrete choice analysis may be used to estimate a mixture method (similar to a regression model) for a group of respondents.

While conjoint analysis and discrete choice analysis determine respondents' preferences for particular attribute levels of associated attributes indirectly, self-explicated analysis directly determines preferences by asking respondents how important each product attribute range and attribute level range is to their purchasing decisions. According to some self-explicated analysis models, respondents are presented with all attributes and attribute levels to be evaluated, and asked to identify attribute levels that are unacceptable. An unacceptable attribute level is one that, if included in a product, would cause the product to be completely unacceptable to the respondent, regardless of any other attributes and attribute levels included in the product. For example, a respondent may indicate that an automobile including an attribute level of "pink" associated with the attribute "color" is completely unacceptable for purchase regardless of any other attributes or attribute levels included in the automobile. Accordingly, "pink" is identified as an unacceptable attribute level for that respondent.

Next, the respondent is asked to identify, from the acceptable attribute levels, the most-desirable and the least-desirable attribute levels associated with each presented attribute. For example, assuming that the respondent's most important attribute has a rating of 100, the consumer is then asked to rate the relative importance of each remaining attribute from 0 to 100. Of course, scales other than 0 to 100 may be used. Next, for each attribute, the desirability of each attribute level is rated with respect to all other acceptable attribute levels of the attribute. The respondent's preference for an attribute level is then obtained by multiplying the relative importance of its associated attribute by its desirability rating.

Hybrid analysis techniques utilize a combination of features from the above-described techniques. The most common example of a hybrid analysis technique is Adaptive Conjoint Analysis (ACA), a product of Sawtooth Software, Inc. According to ACA, a respondent is taken through rankings of attribute levels and ratings of relative attribute importance (similar to self-explicated techniques) and then asked to identify, for each of a series of pairs of product configurations, which one of the pair is the most desirable and the degree to which it is more desirable. Other examples of hybrid models include the Cake Method and the Logit-Cake Method developed by MACRO Consulting, Inc.

Each of these trade-off analysis techniques requires respondents to provide consistent, thoughtful responses to presented inquiries. A respondent may be able to provide such responses if presented with a small number of inquiries, but is unlikely to do so if presented with many inquiries. In this regard, the number of inquiries presented by each of the above techniques increases sharply as the number of evaluated attributes and/or attribute levels increases. Such an increase in the number of inquiries also causes a corresponding increase in the amount of time required to answer the inquiries. Therefore, as more attributes and attribute levels are evaluated, various forms of respondent bias are likely to increase, such as confusion, a waning attention span, a lack of time, a lack of patience, boredom, and haste. These increased respondent biases result in increased respondent error and inaccurate preference information. Also increased is a respondent's tendency to abandon the process and to simply cease answering further inquiries, in which case the resulting preference information is partially or totally unusable.

Another form of respondent bias is caused by consumer attitudes toward particular attributes and/or attribute levels. As described above, conventional trade-off analysis techniques ask a respondent to evaluate the importance of an attribute or attribute level with respect to other attributes or attribute levels. However, if the respondent has an extreme dislike for one of the attributes or attribute levels, the consumer may overestimate the importance of the other attributes or attribute levels. Moreover, a relative importance of an attribute with respect to the difference between its best and worst attribute levels may differ based on a number of intermediate attribute levels presented to a respondent.

In view of the foregoing, what is needed is an efficient trade-off analysis system to quantify consumer preference information. Such a system may or may not address the forms of consumer bias experienced by conventional systems, produce accurate and useful preference information with respect to product attributes and attribute levels, and/or improve manufacturer and/or retailer choices to maximize profit for the manufacturer and/or retailer.

SUMMARY

In order to address the foregoing, the present invention provides a system, method, device, medium and means to provide a user interface including a plurality of selectable graphical elements each representing a respective attribute level of a product attribute, a first area for presenting at least one of the plurality of selectable graphical elements that has been designated by a respondent as representing an unacceptable attribute level, a second area for presenting one of the plurality of selectable graphical elements that has been designated by the respondent as representing a least-preferred attribute level, and a third area for presenting one of the plurality of selectable graphical elements that has been designated by the respondent as representing a most-preferred attribute level.

In some aspects, the present invention provides interface elements manipulable by a respondent to designate one or more product attribute levels as unacceptable, to designate a first attribute level as a least-preferred attribute level, and to designate a second attribute level as a most-preferred attribute level.

Some aspects of the present invention include a first determination, for each of a plurality of attribute levels associated with a product attribute, of a classification of the attribute level as one of unacceptable, most-preferred, least-preferred, or intermediately-preferred, a second determination, after the first determination, of a ranked order of a plurality of product attributes including the product attribute, a third determination, after the second determination, of a relative importance of one or more of the plurality of product attributes, and a fourth determination of a part worth value associated with an attribute level of one of the plurality of attributes based at least on a classification of the attribute level and on a determined relative importance of the associated product attribute.

With these and other advantages and features that will become hereafter apparent, a more complete understanding of the nature of the invention can be obtained by referring to the following detailed description and to the drawings appended hereto.

BRIEF DESCRIPTION OF THE DRAWINGS

FIG. 5 is a representative view of a tabular portion of a product database according to some embodiments of the present invention.

FIG. 6 is a representative view of a tabular portion of a preference information database according to some embodiments of the present invention.

FIG. 12 is a view of preference information as presented to a client according to some embodiments of the present invention.

DETAILED DESCRIPTION

Network Architecture

Figure 1:
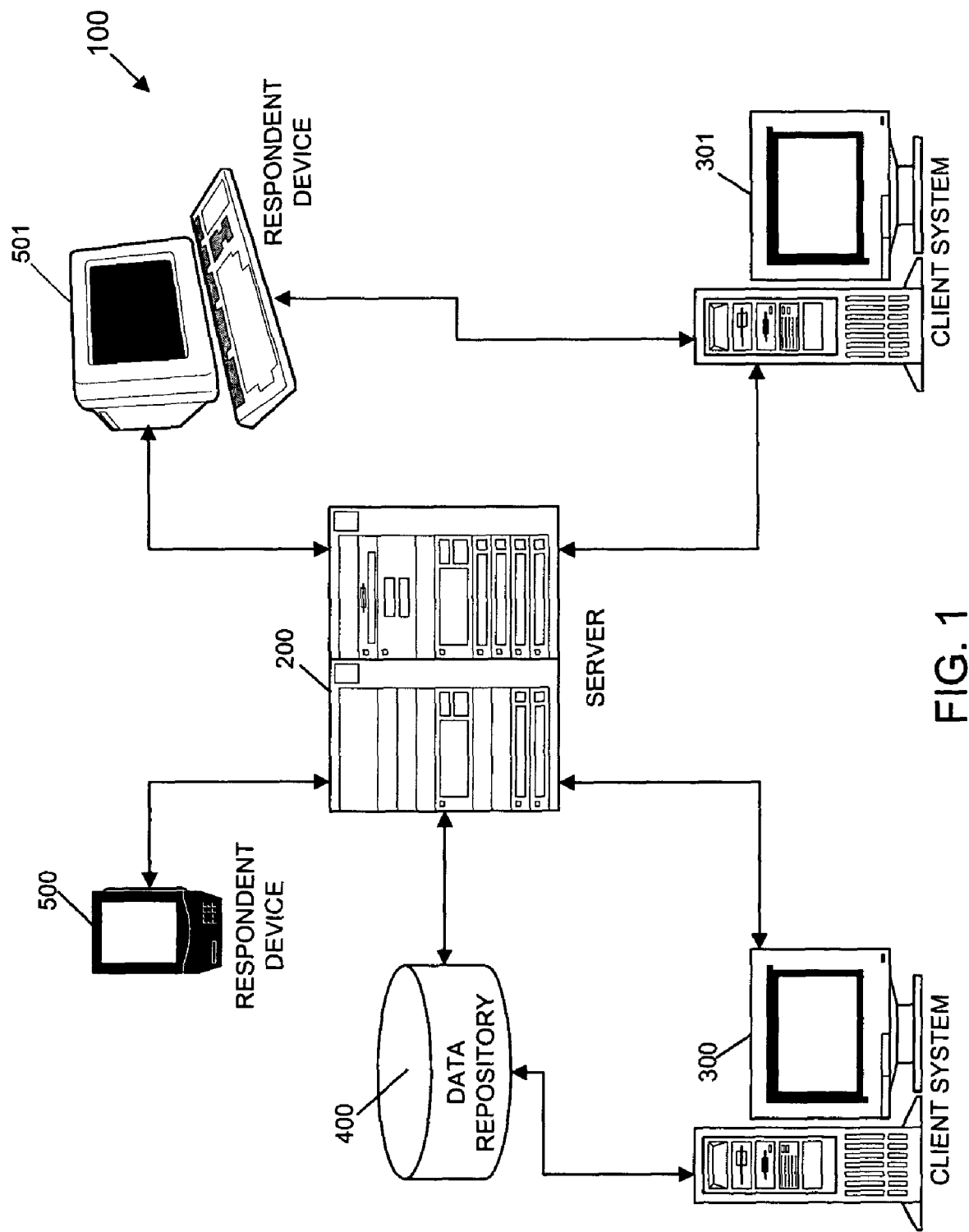
FIG. 1 is a topographic view of a network architecture according to some embodiments of the present invention.

FIG. 1 is a topographic view of network architecture 100 according to some embodiments of the present invention. Of course, many other architectures may be used to implement embodiments of the invention. Shown in FIG. 1 is server 200, depicted as a mainframe computer. Server 200 may be used to perform process steps 700 of FIGS. 7a and 7b in order to determine preference information of part worth values associated with a respondent and a product. Server 200 may be operated by a company, such as assignee Blue Flame Data, Inc., providing trade-off analysis services to manufacturers or other clients desiring to obtain consumer preference information.

In operation, server 200 may use data input by respondents and/or clients, as well as legacy data, third party data and/or observed behavior data to produce such preference information. It should be noted that many other types of computing hardware may be used to perform the functions of server 200, including, but not limited to, a server, a workstation, a network, or any combination of one or more of the foregoing. Further details of server 200 are set forth below with respect to FIG. 2.

In communication with server 200 are client systems 300 and 301. Client systems 300 and 301 may be used according to some embodiments of the present invention to perform any functions required by a client, including scheduling, inventory tracking, billing, accounting, etc. Client systems 300 and 301 may also be used by a product manufacturer to transmit attributes and attribute levels for a given product to server 200 in order to have server 200 determine part worth values associated with each acceptable attribute and attribute level. Other information that may be transmitted from client system 300 and 301 to server 200 includes information for modifying thresholds or other parameters used by the server 200 to determine preference information according to some embodiments of the present invention.

Client systems 300 and 301 may also receive information from server 200 intended for display to a manufacturer or another client. Such information may include real-time monitoring of consumer responses, scenario simulations, or an interface allowing the operator to tweak existing thresholds or parameters while information is being gathered from consumers. Of course, the manufacturer may also use client systems 300 and 301 to view preference information received thereby from server 200.

As shown in FIG. 1, client systems 300 and 301 comprise desktop computer systems. Any other suitable devices may be used as client systems 300 and/or 301 according to some embodiments of the invention, including but not limited to a workstation, a mainframe computer, a kiosk, a personal digital assistant and a computer terminal. In the case that one of client systems 300 and 301 comprises a system having its own input and/or output devices, such as a kiosk, a respondent may also use the system to input answers to inquiries posed according to some embodiments of the invention and to input other indications to server 200. The system may also be used in such a case to present interfaces to the respondent that allow the respondent to input such information.

Server 200 may determine product attributes and attribute levels using data from other sources such as data repository 400. Data repository 400 stores information usable by server 200 in accordance with the processes described herein. The information may include preference information, product information including product attributes and attribute levels, respondent demographic information, marginal costs of particular attribute levels, and process steps executable to determine preference information. The information may be received by data repository 400 from other sources or may be generated, in whole or in part, by data repository 400.

Data used to determine preference information may be transmitted to and/or received from respondents through respondent devices 500 and 501. As shown, such data may be transmitted to and received from a respondent device by a client system, such as client system 301. Respondent devices 500 and 501 respectively comprise a personal digital assistant and a workstation. However, respondent devices 500 and 501 may include any device or combination of devices capable of presenting information, visually and/or aurally, and of transmitting information to an external device. Of course, respondent devices 500 and 501 should be able to communicate with the device or devices with which they are in communication over whatever types of network media exist between the devices.

Although the connections illustrated between the components of FIG. 1 appear dedicated, it should be noted that each of the connections may be shared by other components. Moreover, the connections may comprise one or more of a local area network, a wide area network, a telephone network, a cellular network, a fiber-optic network, a satellite network, an infra-red network, a radio frequency network, or any other type of network which may be used to transmit information among two or more of the devices. Additionally, the devices shown in communication with other devices need not be constantly exchanging data, rather, the communication may be established when necessary and severed at other times or always available but rarely used to transmit data.

In one specific example of operation according to some embodiments of the invention, an operator of client system 300 executes a client application which presents a dashboard interface to the operator. The client application may simply consist of a Web browser which requests a Web page including the dashboard interface from server 200 and displays the Web page to the operator. The operator manipulates the dashboard interface to specify a product for which preference information is desired and respondents to whom the preference information should be associated. The respondents may be specifically identified and/or generally specified according to any type of characteristic. The operator may also specify attributes and attribute levels associated with the product, as well as parameters based on which the preference information should be determined. For example, the operator may use the dashboard interface to indicate that a respondent may not specify any unacceptable attribute levels for one or more attributes. As shown in FIG. 1, the attributes and/or attribute levels may be received from data repository 400.

The product, attributes, attribute levels, and/or parameters are transmitted to server 200 over a direct link or over a network, such as the World Wide Web. Server 200 uses the transmitted information and/or information from outside sources such as data repository 400 to elicit responses from a respondent operating respondent device 500. The responses are then used to create accurate and useful preference information.

As will be described in detail with respect to FIGS. 7a and 7b, server 200 elicits the responses by first selecting a product attribute of the subject product. Next, an interface is presented to the respondent. The interface presents attribute levels associated with the selected attribute, and allows the respondent to designate a classification for each attribute level. Possible classifications include most-preferred, least-preferred, intermediately-preferred, unacceptable, and required. One example of such an interface is described below with respect to FIG. 8.

Server 200 determines a classification of each attribute level of the selected product attribute based on the designations of the respondent. Classification of attribute levels continues for each attribute of interest. After each attribute level has been classified, each attribute is assigned to one of one or more piles. In order to determine which attributes are assigned to which piles, the respondent is asked to group the attributes according to their importance. For example, the attributes may be grouped into three piles representing least-important attributes, most-important attributes, and other attributes. A pile is then selected, and an interface is presented to the respondent asking the respondent to rank each attribute of the selected pile in order of importance. Server 200 determines a ranked order of the attributes of the pile based on the respondent's ranking.

Server 200 then determines a relative importance of one or more of the attributes of the pile to another attribute of the pile based on a response received from the respondent. The response is an answer to a question such as "How important is the difference between (attribute level X) and (attribute level Y) of (attribute 1) relative to the difference between (attribute level A) and (attribute level B) of (attribute 2)?" Determination of the ranked order and the relative importance is performed for each other pile of attributes.

Finally, server 200 determines preference information comprising part worth values associated with several of the attribute levels. By virtue of features of some embodiments of the invention, the preference information is more accurate and useful than previously available preference information because the respondent is presented with queries that are easier to comprehend and easier to accurately answer.

Server

Figure 2:
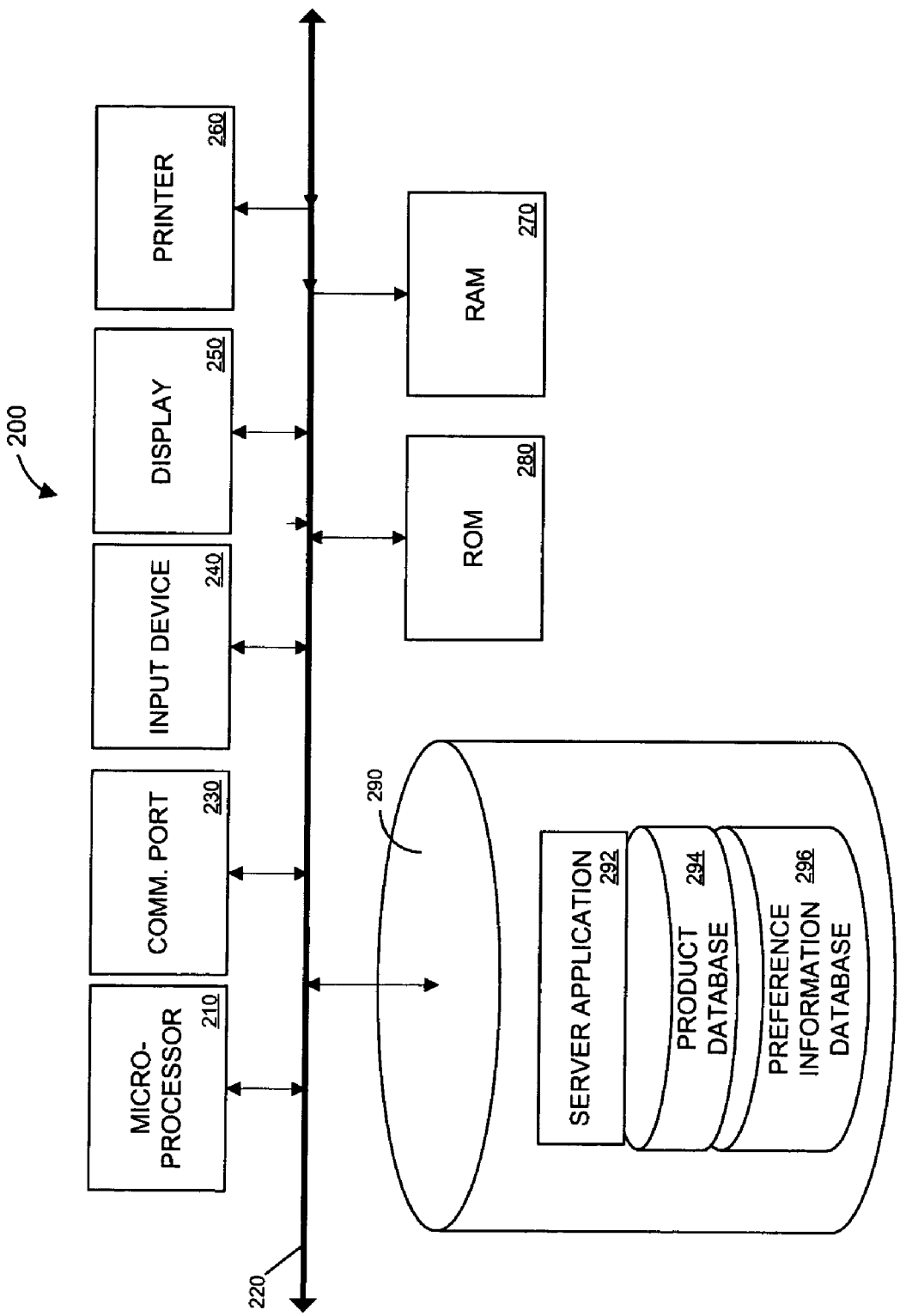
FIG. 2 is a block diagram of an internal architecture of a server according to some embodiments of the present invention.

FIG. 2 is a block diagram of the internal architecture of server 200 according to some embodiments of the invention. As illustrated, server 200 includes microprocessor 210 in communication with communication bus 220. Microprocessor 210 may be a Pentium, RISC-based, or other type of processor and is used to execute processor-executable process steps so as to control the components of server 200 to provide desired functionality.

Also in communication with communication bus 220 is communication port 230. Communication port 230 is used to transmit data to and to receive data from external devices. Communication port 230 is therefore preferably configured with hardware suitable to physically interface with desired external devices and/or network connections. In one embodiment, interfaces are transmitted to and designations are received from respondent device 500 over communication port 230.

Input device 240, display 250 and printer 260 are also in communication with communication bus 220. Any known input device may be used as input device 240, including a keyboard, mouse, touch pad, voice-recognition system, or any combination of these devices. Input device 240 may be used by an operator to input product-related information such as attributes and attribute levels, respondent-related information such as contact and identification information, client-related information such as billing and transaction information, and commands to server 200. In this regard, input device may be used to input a command to server 200 for outputting a report detailing a particular client's account or a particular respondent's or group of respondent's preference information.

Such a report may be output to display 250, which may be an integral or separate CRT display, flat-panel display or the like. Display 250 is used to output graphics and text to an operator in response to commands issued by microprocessor 210. Printer 260 is also an output device, but produces a hardcopy of data using ink-jet, thermal, dot-matrix, laser, or other printing technologies.

RAM 270 is connected to communication bus 220 to provide microprocessor 210 with fast data storage and retrieval. In this regard, processor-executable process steps being executed by microprocessor 210 are typically stored temporarily in RAM 270 and executed therefrom by microprocessor 210. ROM 280, in contrast, provides storage from which data can be retrieved but to which data cannot be stored. Accordingly, ROM 280 is used to store invariant process steps and other data, such as basic input/output instructions and data used during system boot-up or to control communication port 230.

Data storage device 290 stores, among other data, processor-executable process steps of server application 292. According to some embodiments of the present invention, the process steps of server application 292 may be read from a computer-readable medium, such as a floppy disk, a CD-ROM, a DVD-ROM, a Zip disk, a magnetic tape, or a signal encoding the process steps, and then stored in data storage device 290. Server application 292 may be stored in data storage device 290 in a compressed, uncompiled and/or encrypted format. Microprocessor 210 executes instructions of application 292, and thereby operates in accordance with the present invention, and particularly in accordance with the process steps described in detail herein.

Specifically, according to some embodiments of the invention, microprocessor 210 executes processor-executable process steps of server application 292 to provide for a first determination, for each of a plurality of attribute levels associated with a product attribute, of a classification of the attribute level as one of unacceptable, most-preferred, least-preferred, or intermediately-preferred, a second determination, after the first determination, of a ranked order of a plurality of product attributes including the product attribute, a third determination, after the second step, of a relative importance of one or more of the plurality of product attributes, and a fourth determination of a part worth value associated with an attribute level of one of the plurality of attributes based at least on a classification of the attribute level and on a determined relative importance of the associated product attribute.

Also according to some embodiments of the invention, the process steps provide a user interface including a plurality of selectable graphical elements each representing a respective attribute level of a product attribute, a first area for presenting at least one of the plurality of selectable graphical elements that has been designated by a respondent as representing an unacceptable attribute level, a second area for presenting one of the plurality of selectable graphical elements that has been designated by the respondent as representing a least-preferred attribute level, and a third area for presenting one of the plurality of selectable graphical elements that has been designated by the respondent as representing a most-preferred attribute level.

In alternative embodiments, hard-wired circuitry may be used in place of, or in combination with, processor-executable process steps for implementation of the processes of some embodiments of the present invention. Thus, embodiments of the present invention are not limited to any specific combination of hardware and software.

Also included in server application 292 may be processor-executable process steps to provide a Web server. Such a Web server would allow server 200 to communicate with client systems 300 and 301 as well as respondent devices 500 and 501 through the World Wide Web. Also stored in data storage device 290 is product database 294 and preference information database 296. Product database 294 includes information used to determine preference information associated with particular products and preference information database 296 includes preference information determined according to some embodiments of the present invention. These databases will be discussed in detail with reference to FIGS. 5 and 6, respectively.

Data storage device 290 furthermore includes program elements that may be necessary for operation of server 200, such as an operating system, a database management system and device drivers for allowing microprocessor 210 to interface with devices in communication with communication port 230. These program elements are known to those skilled in the art, and need not be described in detail herein. Of course, data storage device 290 may also include applications and data for providing functionality unrelated to the present invention.

Client System

Figure 3:
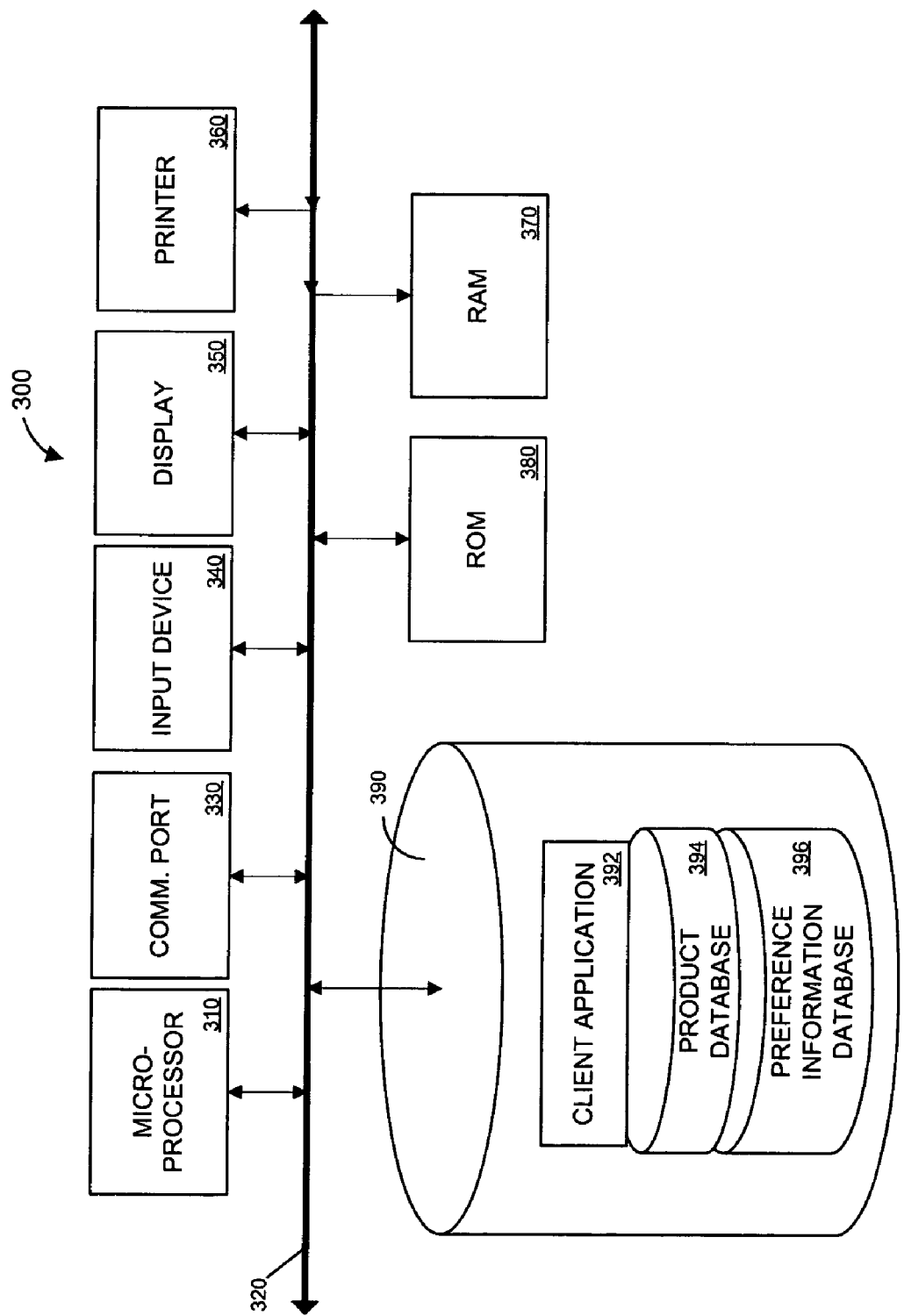
FIG. 3 is a block diagram of an internal architecture of a client system according to some embodiments of the present invention.

FIG. 3 illustrates an internal architecture of client system 300. As shown, client system 300 according to the depicted embodiment includes microprocessor 310, communication port 330, input device 340, display 350, printer 360, RAM 370 and ROM 380, each of which is in communication with communication bus 320. Possible embodiments for each of these components are similar to those described with respect to identically-named components of FIG. 2, although functions performed by the components of FIG. 3 according to some embodiments of the invention may differ from those performed by the components of FIG. 2.

Specifically, input device 340 may be used by a manufacturer operating client system 300 to input product attributes and attribute levels for which preference information is sought, and also to input demographic information of a typical respondent from whom preference information is desired. Display 350 and printer 360 may be used to output information received from server 200, such as preference information. Of course, this information may be determined by client system 300 instead of being received from server 200. In a case that client system 300 is a kiosk or other device usable by both a respondent and a client manufacturer, input device 340, display 350 and printer 360 may also be used by a respondent to receive inquiries from and to input responses to inquiries and other indications to server 200.

Data storage device 390 stores client application 392, product database 394 and preference information database 396. Client application 392 includes processor-executable process steps which may be executed by microprocessor 310 to perform the process steps described herein. According to some embodiments of the invention, client application 392 includes process steps to provide the functions attributed herein to server 200.

Client application 392 may also include processor-executable process steps to provide a Web browser. As described with respect to server 200, a Web browser would allow client system 300 to communicate with a Web server executed by server 200.

Product database 394 includes information similar to that included in product database 294. The information included in product database 394, however, is input in some embodiments by a manufacturer operating client system 300. Preference information database 396 includes preference information that may be transmitted by server 200 to client system 300 or may be generated by client system 300 according to some embodiments of the invention.

As mentioned with respect to server 200, data storage device 390 may also store applications, data, operating system and device driver files used to provide functionality that is related and/or unrelated to the present invention.

Respondent Device

Figure 4:
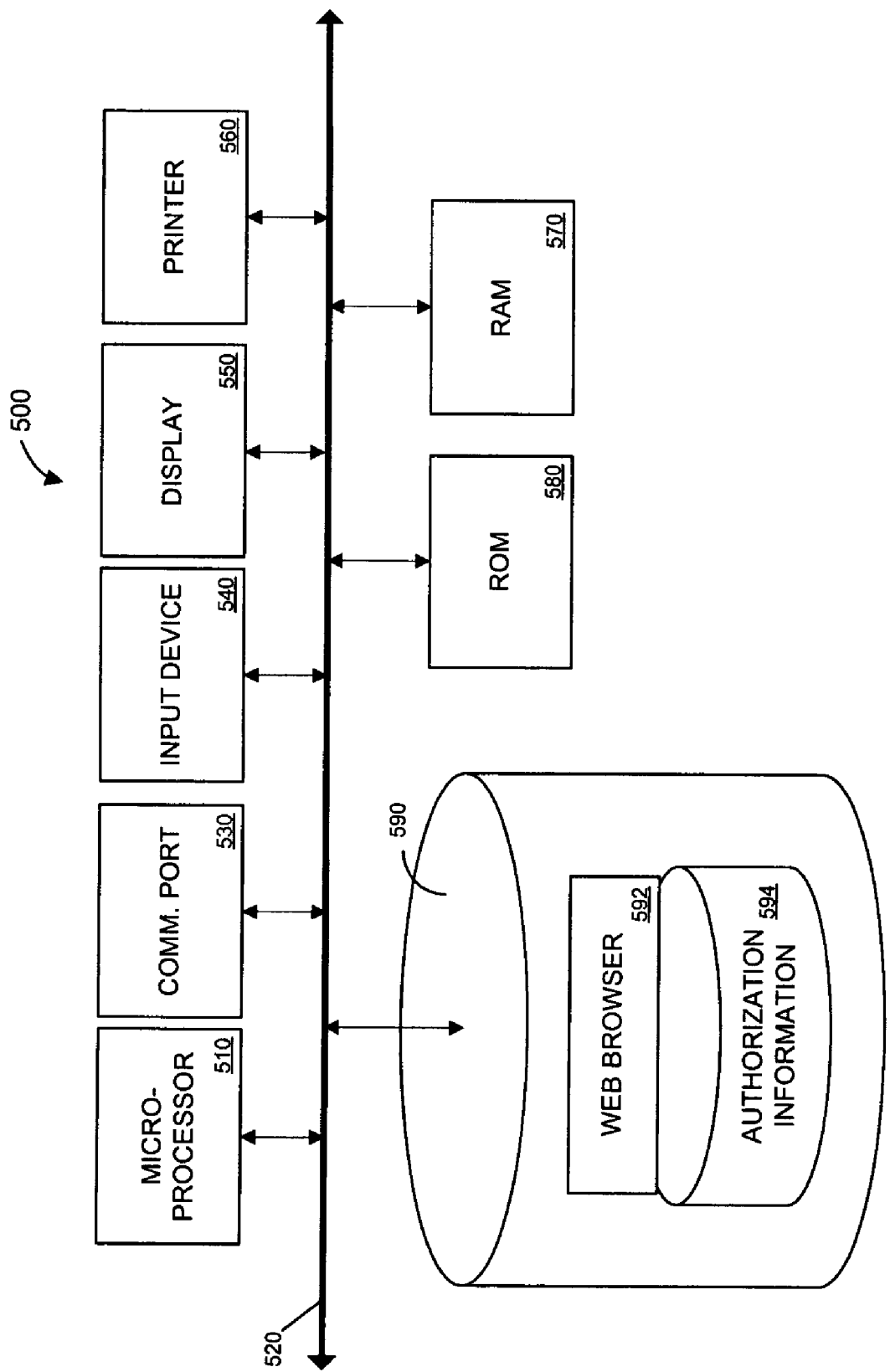
FIG. 4 is a block diagram of an internal architecture of a respondent device according to some embodiments of the present invention.

FIG. 4 illustrates several components of respondent device 500 according to some embodiments of the invention. As briefly described above, communication port 530 may be used to receive interfaces and/or queries from server 200 and to transmit responses and/or designations in response thereto. In this regard, input device 540 may be used by a respondent to manipulate an interface presented on display 550 so as to designate an attribute level as unacceptable, required, most-preferred, least-preferred, or intermediately-preferred. Input device 540, display 550 and printer 560 may also be used in conjunction with other applications provided by respondent device 500 which are unrelated to the present invention.

Storage device 590 of respondent device 500 stores processor-executable process steps of Web browser 592. The process steps may be executed by microprocessor 510 to allow communication with Web servers such as the Web server provided by server application 292 of server 200. Authorization information 594 includes information used to determine whether a user of respondent device 500 is authorized to receive interfaces and/or queries from server 200. For example, authorization information 594 may include usernames and passwords of users who might operate respondent device 500. The information may also be transmitted to server 200 to ensure that a user of respondent device 500 is a respondent of whom preference information is desired. Information may be stored in authorization information 594 in the form of Web cookies.

Storage device 590 may store one or more of other applications, data files, device drivers and operating system files needed to provide functions other than those directly related to the present invention. Such functions may include calendaring, e-mail access, word processing, accounting, presentation development and the like.

Product Database

A tabular representation of a portion of product database 294 is shown in FIG. 5. Product database 294 stores data specifying attributes and associated attribute levels for particular products and particular clients. Specifically, client:product field 502 indicates a client and a product, while attribute field 504 and attribute levels field 506 respectively specify attributes and attribute levels that are to be evaluated for the client with respect to the product. Accordingly, the FIG. 5 representation provides client-specific attributes and attribute levels for a particular product. Of course, product database 294 may specify attributes and attribute levels for a particular product that are not associated with any one particular client.

Also associated with attribute field 504 and attribute levels field 506 in a single record are implicit order flag field 508 and unacceptable levels allowed? field 510. Implicit order flag field 508 indicates whether or not associated attribute levels are listed in order of consumer preference. Usage of implicit order flag field 508 will be described below. Unacceptable levels allowed? field 510 specifies whether or not a respondent will be allowed to classify any of the associated attribute levels as unacceptable. It should be noted that data of attribute field 504, attribute levels field 506, implicit order flag field 508 and unacceptable levels allowed? field 510 may be specified by a respondent or by a client and received by server 200 from client system 300, respondent device 500, and or from one or more other sources. Of course, server 200 may also determine the data independently.

Although shown in FIG. 5 are data specifying particular attributes and attribute levels, some embodiments of the invention contemplate evaluating fewer or more attributes and/or attribute levels for any particular product. Additionally, it is contemplated that product database 294 may store data for multiple products and/or multiple clients. In contrast, it is contemplated that, in some embodiments, product database 394 of in client system 300 might store only data associated with the particular client operating client system 300.

The data stored in product database 294 may be used in accordance with some embodiments of the present invention to determine preference information relating to the attributes and attribute levels of fields 504 and 506. One such embodiment was described above with respect to FIG. 1. After this determination, the preference information may be stored in preference information database 296, and/or transmitted to client system 300 for storage in preference information database 396.

Preference Information Database

FIG. 6 shows a tabular representation of a portion of preference information database 296 according to some embodiments of the invention. The data stored in preference information database 296 reflects preference information associated with a respondent and/or with a group of respondents. As shown by respondent:product field 602, the portion reflects preference information of a single respondent with respect to a single product. Each record in the tabular portion includes attribute field 604 and attribute level/associated part worth value field 606. A part worth value associated with an attribute level represents a respondent's preference for the attribute level as determined according to some embodiments of the present invention. This determination will be described in detail below with respect to FIGS. 7a and 7b.

As mentioned with respect to product database 294, the data stored in preference information database 296 for a particular product may reflect fewer or more attributes and/or attribute levels than shown in FIG. 6. Furthermore, it is contemplated that preference information database 296 will store data corresponding to multiple respondents and to multiple products for some of the respondents. On the other hand, it is contemplated that preference information database 396 of client system 300 might store preference information of multiple respondents but corresponding only to those products to be sold by the particular client operating client system 300.

As will be understood by those skilled in the art, the tabular illustrations and accompanying descriptions of product database 294 and preference information database 296 merely represent relationships between stored information. A number of other arrangements may be employed besides those suggested by the illustrations. Similarly, the illustrated entries of the databases represent sample information only; the reader will understand that the number and content of the entries can be different from those illustrated.

SPECIFIC EXAMPLE

Figure 7A:
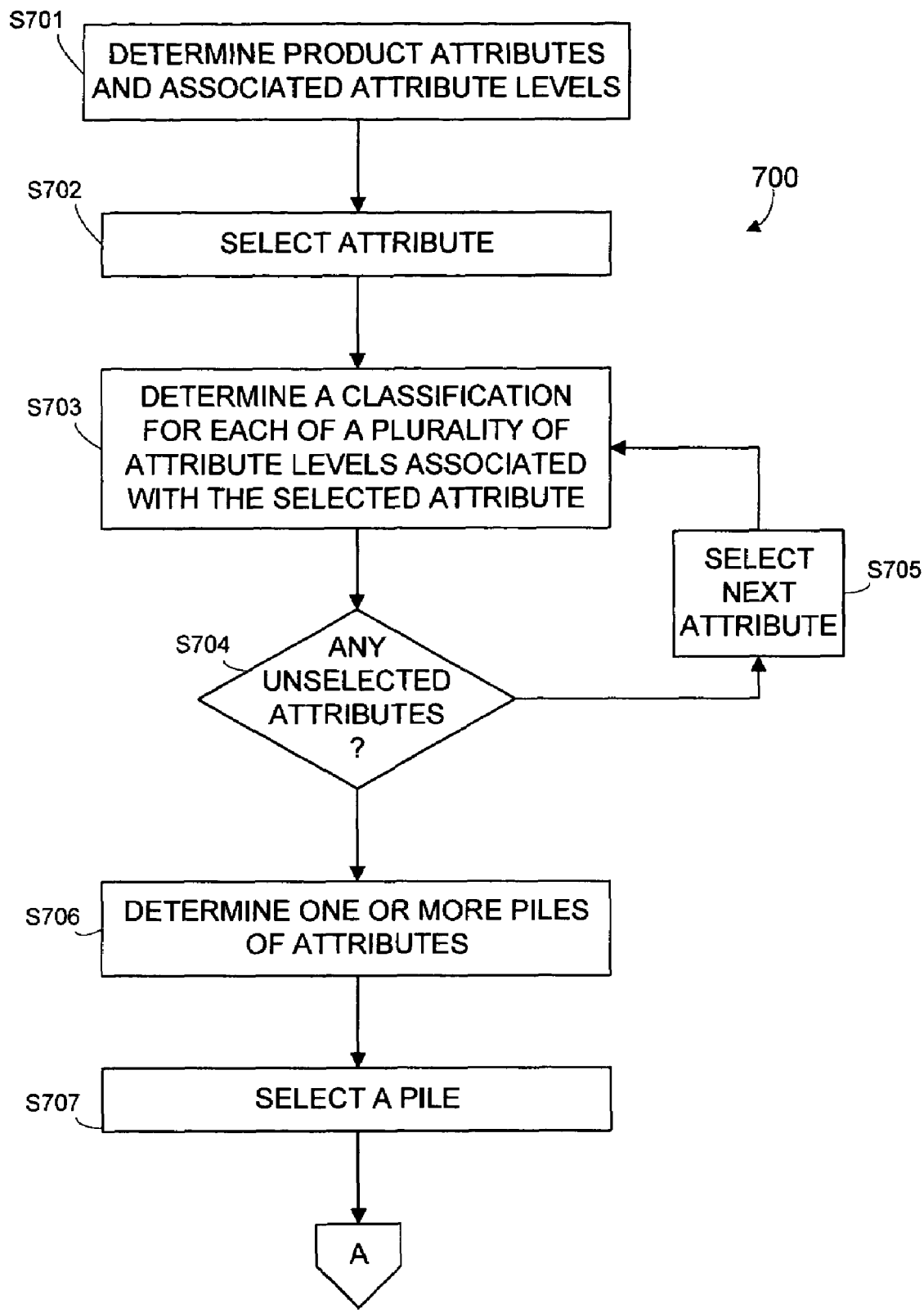
FIGS. 7a and 7b comprise a flow diagram of process steps according to some embodiments of the present invention.
Figure 7B:
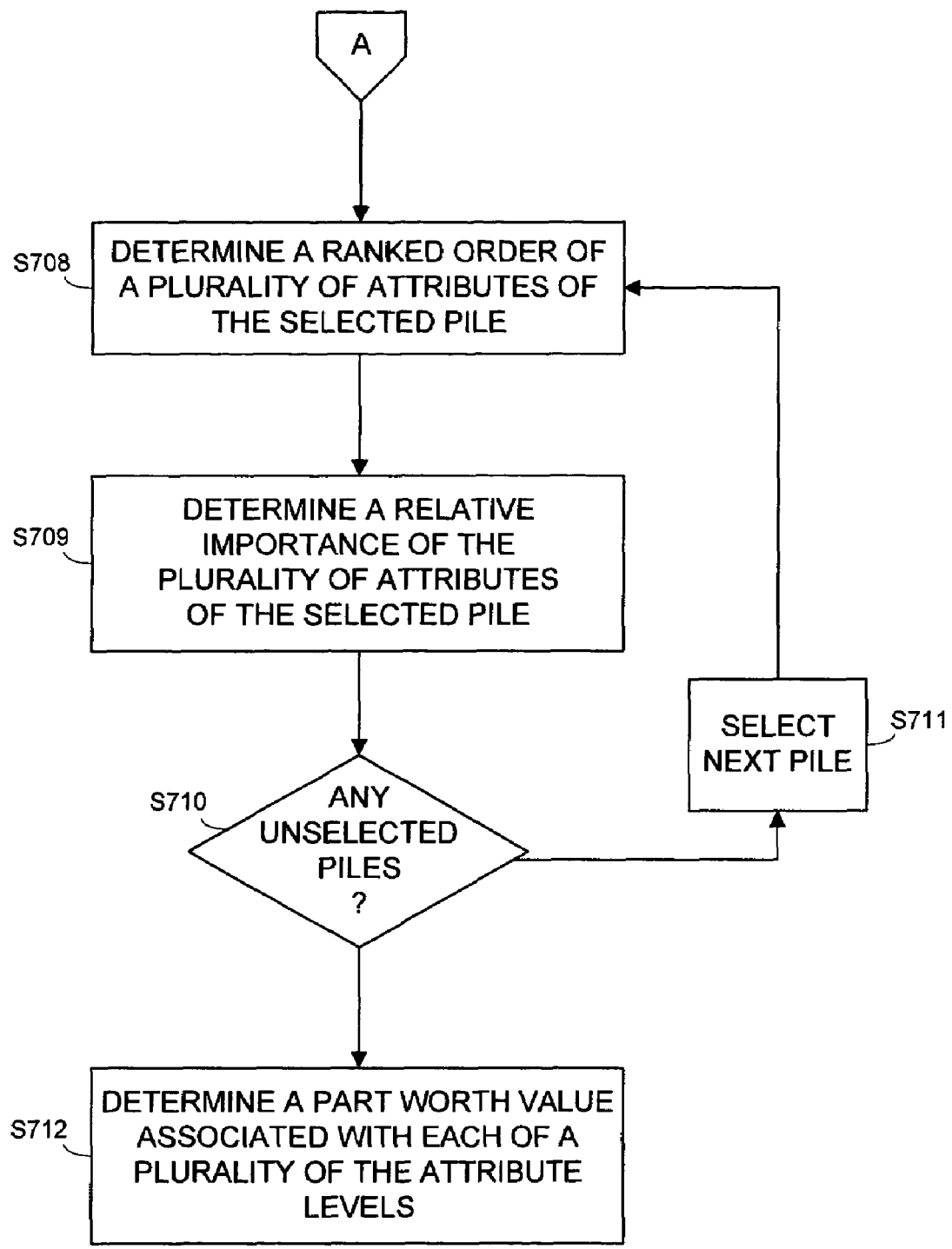

FIGS. 7a and 7b comprise a flow diagram of process steps 700 to determine preference information according to some embodiments of the present invention. Process steps 700 are described herein as being performed by server 200 through execution of processor-executable process steps of server application 292 by microprocessor 210. However, the process steps may also be performed, in whole or in part, by one or more of server 200, client systems 300 and 301, respondent devices 500 and 501, another device, and manual means.

A plurality of product attributes and associated attribute levels for a subject product is initially determined in step S701. In the example set forth below, the subject product is a pair of downhill skis, and the attributes are "Brand", "Price", "Length", "Type" and "Warranty". Each determined attribute is associated with one or more attribute levels, which are shown in association with the attributes in product database 294 of FIG. 5. Accordingly, the attributes may be determined by server 200 in step S701 by referring to attributes associated with the subject product in product database 294. Server 200 may also determine the attributes by receiving data representing the attributes from an operator via input device 240 or by receiving data representing the attributes from client system 300. In the latter case, client system 300 may retrieve the attributes from product database 394 or from an operator operating input device 340. Moreover, the attributes may be determined in step S701 by receiving the attributes from a respondent after identifying the product to the respondent. In this regard, the respondent may be asked to select or specify the attributes and/or attribute levels which are of concern when deciding whether to purchase the product.

Figure 8:
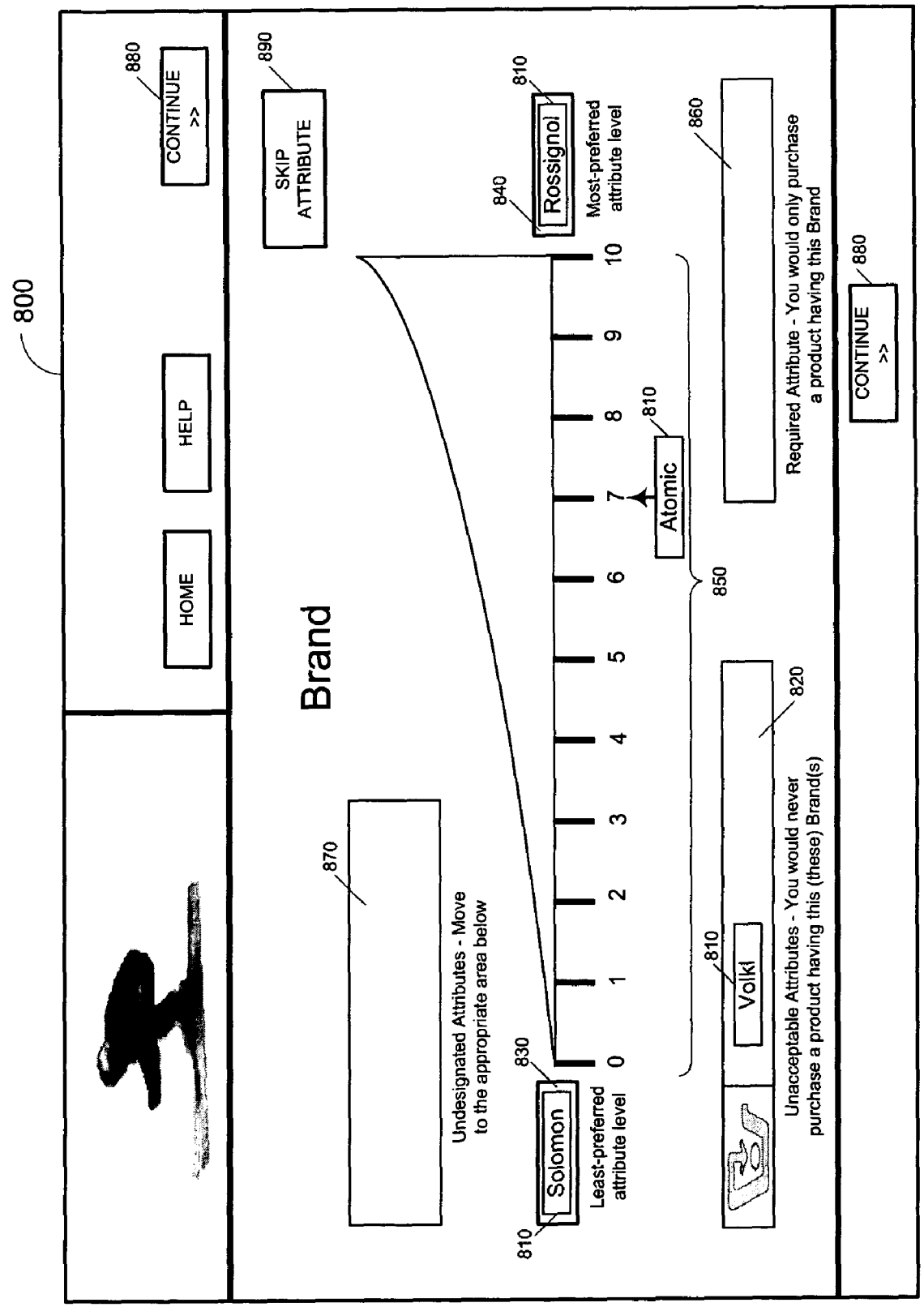
FIG. 8 is a view of an interface used to elicit information from a respondent according to some embodiments of the present invention.

One of the determined attributes is selected in step S702. Next, in step S703, a classification is determined for each of a plurality of attribute levels associated with the selected attribute. In some embodiments, the classification is determined based on designations received from a respondent. FIG. 8 illustrates a user interface usable to receive designations from a respondent. User interface 800 may be included within a Web page generated by a Web server executing within server 200 and transmitted to respondent device 500, which in turn presents interface 800 using display 550. User interface 800, as well as the other user interfaces described below, may originate at server 200 and be transmitted to respondent device 500 directly from server 200 or from server 200 through an intermediate device such as client system 300. Similarly, the user interfaces described herein may originate at client system 300 and be transmitted to respondent device 500 directly or through an intermediate device.

Generally, user interface 800 includes interface elements manipulable by a respondent to designate one or more product attribute levels as unacceptable, to designate a first attribute level as a least-preferred attribute level, and to designate a second attribute level as a most-preferred attribute level. More specifically, the FIG. 8 interface includes a plurality of selectable graphical elements 810, with each of graphical elements 810 representing a respective attribute level of the attribute selected in step S702. Interface 800 also includes area 820 for presenting at least one of the plurality of selectable graphical elements 810 that has been designated by the respondent as representing an unacceptable attribute level, area 830 for presenting one of the plurality of selectable graphical elements 810 that has been designated by the respondent as representing a least-preferred attribute level, and area 840 for presenting one of the plurality of selectable graphical elements 810 that has been designated by the respondent as representing a most-preferred attribute level.

Interface 800 also includes area 850 for presenting one or more of the plurality of selectable graphical elements 810 that has been designated by the respondent as representing an intermediately-preferred attribute level. As shown, area 850 includes a scale that associates a position of a graphical element within area 850 with a quantitative scale value between 0 and 10 that represents the respondent's preference for the attribute level represented by the graphical element with respect to the most- and least-preferred attribute levels. Of course, other scale ranges may be used in conjunction with some embodiments of the invention.

Moreover, interface 800 includes area 860 for presenting one or more of the plurality of selectable graphical elements 810 that has been designated by the respondent as representing a required attribute level. An attribute level designated as required overrules all other level designations. Accordingly, an attribute level A that was previously designated "most-preferred" will be overruled if attribute level B is designated as required. For attribute levels that are associated with a particular attribute and are mutually-exclusive, area 860 may be limited to presenting one attribute level.

In some embodiments, all selectable graphical elements 810 are located in area 870 when interface 800 is initially presented to a respondent. In one specific example, the respondent operates input device 540 to select and drag one or more of elements 810 from area 870 to an area of interface 800 in order to designate that the attribute levels represented by the dragged elements are unacceptable, most-preferred, least-preferred, intermediately-preferred, or required. In some embodiments, interface 800 may present a message to the respondent in response to an element being dragged to area 820. One example of such a message is: "You have rated attribute level X as unacceptable. You will never be offered a product that includes this attribute level, thereby limiting the products that are offered to you. Are you sure that you want to rate this attribute level as unacceptable?"

The respondent selects one of Continue icons 880 after designating classifications of zero, one, several or all of elements 810. In some embodiments, icon 880 is selectable only if each attribute level represented in interface 800 has been designated as unacceptable, most-preferred, least-preferred, intermediately preferred, or required. Some embodiments may require that at least two attribute levels are not designated as unacceptable. Selection of one of icons 880 causes the designations to be transmitted to server 200. Accordingly, classifications are determined based on the received designations.

User interface 800 also includes Skip Attribute icon 890. Selection of icon 890 allows a respondent to stop designating attribute levels of the displayed attribute and, in some embodiments, to begin designating attribute levels of another attribute. In some embodiments, any undesignated attribute levels are inferred. As a result, if the respondent selects a "most-preferred" attribute level, and then selects icon 890, remaining undesignated attribute levels are ignored in further processing. Even those designations made prior to selection of icon 890 are ignored in some embodiments.

It should be noted that interfaces different from interface 800 may be used to receive attribute level designations from a respondent. In some embodiments, a client for whom preference information is being determined may instruct server 200, using client application 392, that a respondent may not designate attribute levels of a particular one or more attributes as unacceptable. Accordingly, area 820 of interface 800 associated with the particular attributes may be removed, "grayed-out", or otherwise disabled. In a case that one of the particular attributes is also implicit, user interface 800 corresponding to that attribute may pre-populate areas 830 and 840 with graphical elements representing a least-preferred and a most-preferred attribute level.

Other features may be based on whether an attribute is implicit. For example, some embodiments of interface 800 may prevent a respondent from designating an attribute level of an implicit attribute as unacceptable unless every less-preferable attribute level has been designated as unacceptable. In some embodiments, all the less-preferable attribute levels are automatically designated as unacceptable in response to a designation of an attribute level of an implicit attribute as unacceptable. In other examples, an attribute level of an implicit attribute is designated as most-preferred and all attributes having a higher implicit desirability are automatically designated as unacceptable. In some embodiments, attribute levels must be designated consistently with their implicit ordering.

According to some embodiments, removing an attribute level from area 820 results in removing the designation of the attribute level as unacceptable and also causes all previously-designated attribute levels to lose their designations. For example, each attribute level may be moved back to area 860.

Flow proceeds from step S703 to step S704 to determine if all the attributes determined in step S701 have been selected. If not, a next attribute is selected and flow returns to step S703 to determine a classification for each of a plurality of attribute levels associated with the newly-selected attribute. Flow therefore cycles between steps S703 through S705 until classifications have been determined for all attribute levels of each attribute determined in step S701.

In some embodiments of the invention, an interface showing attribute levels of an attribute is not presented in step S703 if the attribute is implicit and consists of two attribute levels, such as the Warranty attribute of the present example. According to these embodiments, the less-desirable implicit attribute level is determined in step S703 to be a least-preferred attribute level and the most-desirable implicit attribute level is determined to be a most-preferred attribute level without receiving a designation from the respondent.

Figure 9:
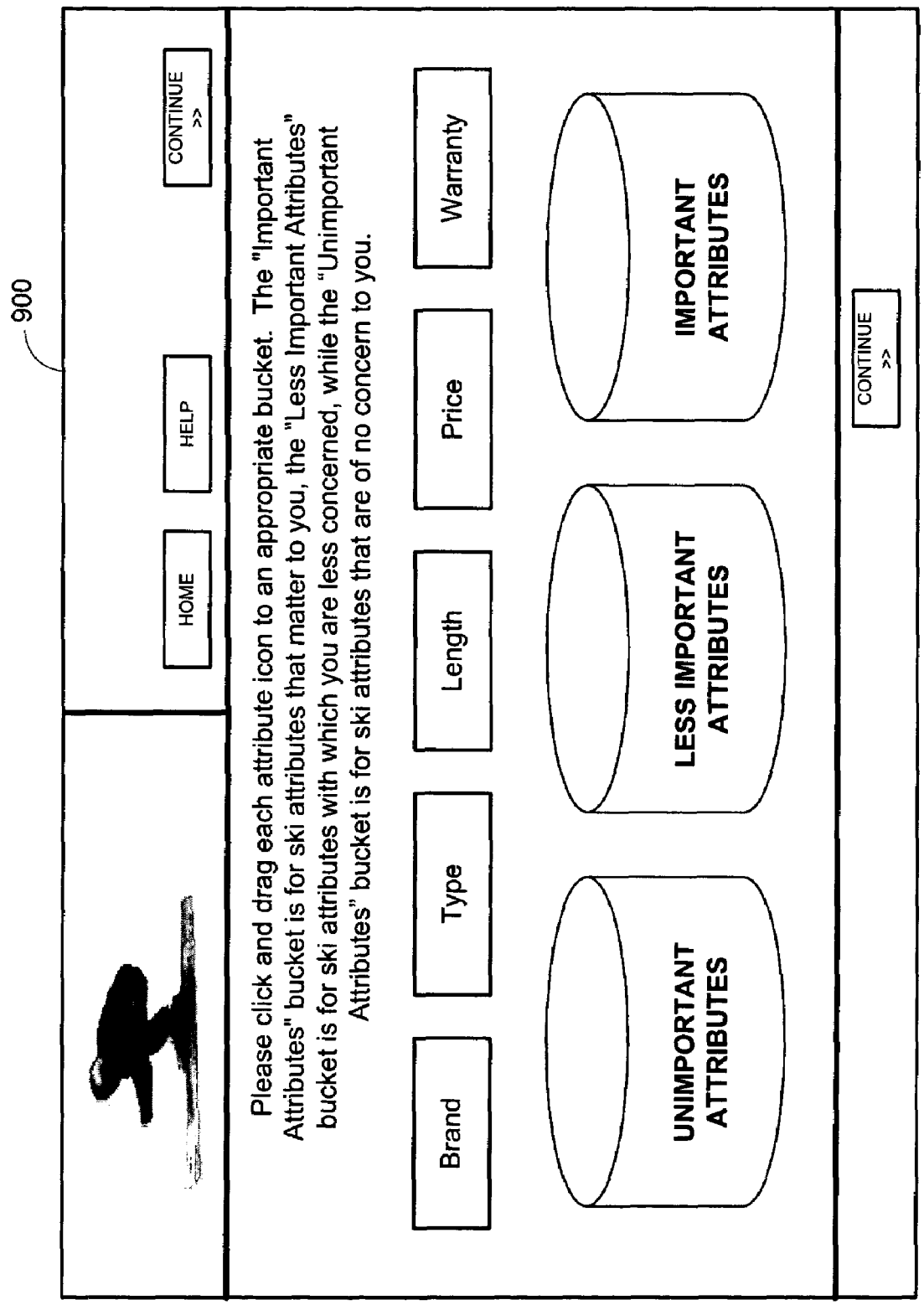
FIG. 9 is a view of an interface used to elicit information from a respondent according to some embodiments of the present invention.

Next, in step S706, one or more piles of attributes are determined. The piles may be determined by presenting interface 900 of FIG. 9 to a respondent. Interface 900 asks the respondent to manipulate the interface so as to designate each attribute as either "unimportant", "less important" or "important". In terms of the present disclosure, the "unimportant", "less important" and "important" designations refer to separate attribute piles. It should be noted that three or more piles may be determined in accordance with the present invention. In other embodiments, user interface 900 is presented to a respondent only if the number of attributes is greater than a threshold number, such as nine. The threshold number may depend on an amount of time in which process steps 700 must be completed or on a maximum number of questions to be asked to the respondent, and may be set by server 200, client system 300 or respondent device 500.

Figure 10:
FIG. 10 is a view of an interface used to elicit information from a respondent according to some embodiments of the present invention.

Server 200 then selects one of the piles in step S707 and determines a ranked order of attributes in the selected pile in step S708. Such a ranked order may be determined by forwarding user interface 1000 of FIG. 10 to respondent device 500 and receiving input thereto. Although user interface 1000 specifies a ranked order according to numbers assigned to each attribute, a ranked order may also be determined by asking the respondent to specify a difference in desirability of the most-desirable and the least-desirable attribute level of each attribute. The attributes are then ranked according to the differences, with the attribute having the greatest difference being the highest-ranked attribute. Such ranking may be performed for one, some, or all piles.

Figure 11:
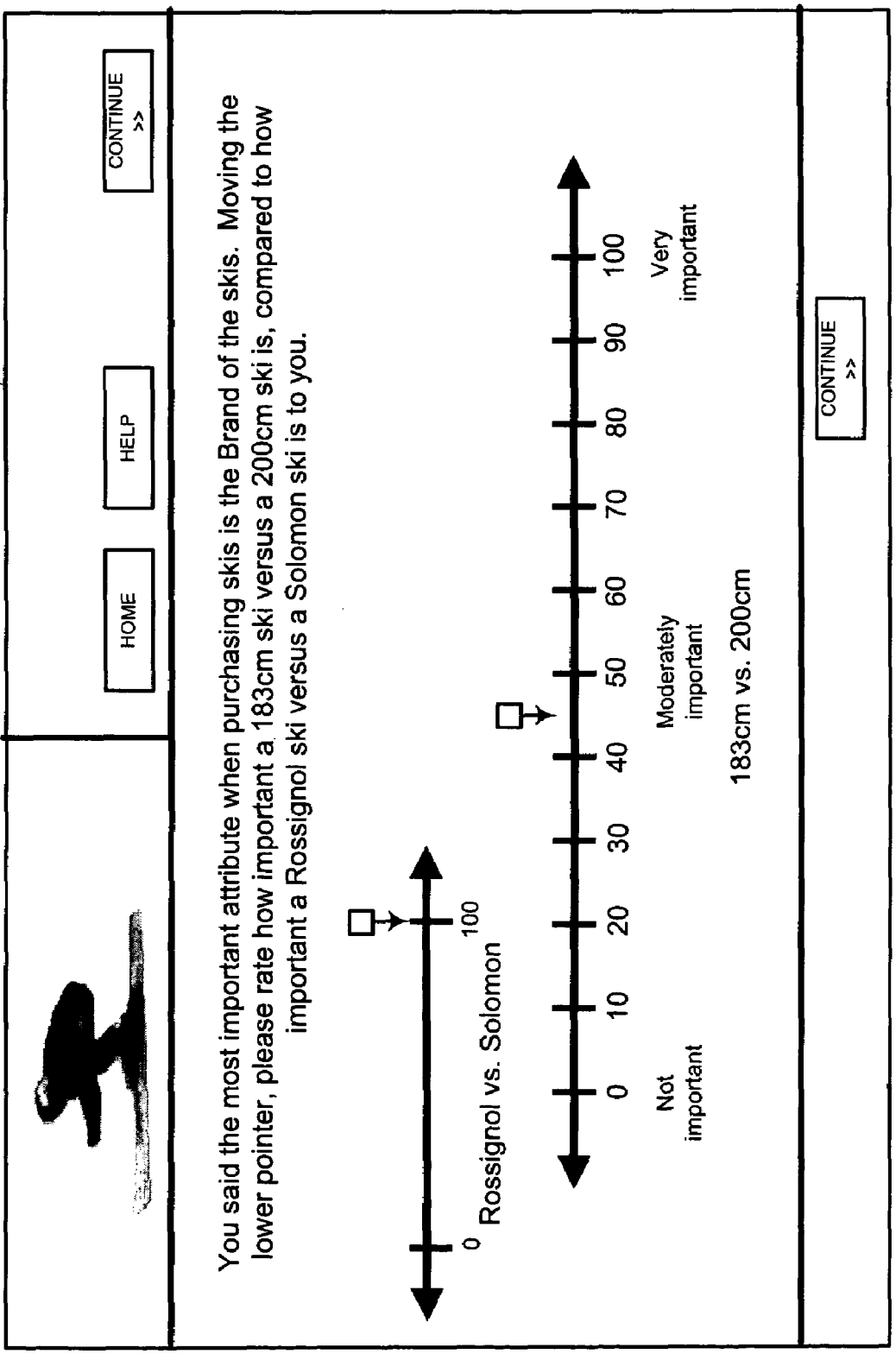
FIG. 11 is a view of an interface used to elicit information from a respondent according to some embodiments of the present invention.

User interface 1100 of FIG. 11 is then used in step S709 to determine a relative importance of the attributes of the selected pile with respect to the highest-ranked attribute of the pile. In the embodiment of FIG. 11, the importance is determined by asking the respondent to rate, for each attribute other than the highest-ranked attribute, the importance of the most-preferred attribute level versus the least-preferred attribute level as compared to the importance of the most-important attribute's most-preferred attribute level versus its least-preferred level.

In some embodiments, the above question is asked with respect to each attribute according to ranked order. That is, a relative importance of a second-ranked attribute is determined before the relative importance of a third-ranked attribute. According to some embodiments, the respondent is asked to rate the importance of fewer than all of the remaining attributes of the selected pile. For example, a respondent may be asked to rank the importance of the top 20 attributes or the top 20% of attributes in the selected pile, based on the determined ranked order. The amount of attributes rated may be selected by the client, selected by the respondent, or assumed by server 200 based on any factor, including a time allotted to receive information from the respondent. The unrated attributes according to these embodiments may be assigned importances based on their relative ranks. In this regard, in a case that a sixth-lowest ranked attribute is assigned a relative importance of 12%, the attributes having the five lowest ranks may be automatically assigned relative importances of 10%, 8%, 6%, 4%, and 2%, respectively.

The relative importances of all attributes may also be determined by designating the most-important attribute in the selected pile as having a relative importance of 100% and asking the respondent to specify percentage values for each other attribute in the pile. Moreover, the relative importance of an attribute may be determined by evaluating a rating of the respondent of the importance of the difference between the most-preferred and least-preferred attribute levels of the attribute relative to the difference between the most-preferred and least-preferred attribute levels of the highest-ranked attribute.

Additionally, the relative importance may be determined in step S709 through a respondent rating of the importance of the difference between the most-preferred and least-preferred attribute levels of the attribute relative to the difference between the most-preferred and least-preferred attribute levels of the lowest-ranked attribute. The relative importances may also be based on the attribute ranking received through user interface 900, wherein, for example, the highest-ranked attribute is assigned a 100% relative importance, the lowest-ranked attribute is assigned a 1% importance and the remaining attributes are spaced evenly within the intervening range.

Next, in step S710, it is determined whether any of the piles determined in step S706 have not been selected. If so, flow continues to step S711, wherein a next pile is selected and flow returns to step S708. If not, flow proceeds to step S712. In some embodiments, flow proceeds to step S712 from step S710 even if one or more of the determined piles has not been selected. According to these embodiments, all piles are not subjected to steps S708 and S709 because of time constraints, instructions from client system 300, or other factors.

In step S712, a part worth value of each attribute level may be determined based on its associated scale value and the relative importance of its associated attributes. In the present example, attribute level "Atomic" was determined to have a scale value of "7" based on input to user interface 800. Additionally, "Brand" was determined to be the most-important attribute based on input to user interface 1000, and therefore was assigned a relative importance of 100% in step S709. Accordingly, the part worth value associated with "Atomic" is (100%×7)=7. Similarly, the part worth values corresponding to "Rossignol" and "Solomon" are (100%×10)=10 and (100%×0)=0, respectively. The attribute level "Volkl" is not associated with a part worth value because the attribute level was designated as unacceptable.

Preference information database 296 of FIG. 6 is populated with preference information determined according to the present example of some embodiments of the invention. As shown, an unacceptable attribute level has no part worth value and the associated value is therefore represented by "X".

FIG. 12 is a view of preference information 1200 as presented to a client according to some embodiments of the present invention. Preference information 1200 is intended to provide a client with a comprehensible breakdown of preference information determined according to some embodiments of the present invention. Preference information 1200 may be presented to the client in many ways, including by transmitting data representing preference information 1200 to client system 300, by transmitting a Web page including preference information 1200 to client system 300, by displaying preference information 1200 to the client using display 250 or display 350, and by providing to the client a hardcopy of preference information 1200 produced using printer 260 or printer 360. As shown, preference information 1200 reflects the data stored in preference information database 296 of FIG. 6.

Although the present invention has been described with respect to particular embodiments thereof, those skilled in the art will note that various substitutions may be made to those embodiments described herein without departing from the spirit and scope of the present invention.

What is claimed is:

1. A computer-implemented method for determining preference information for a respondent, the method comprising:

accessing a computer memory storage system that stores information related to attributes that are characteristic of a type of product;

based on accessing the computer memory storage system, identifying attributes that are characteristic of the product from the computer memory storage system, each of the attributes identified from the computer memory storage system having different attribute levels that reflect different possible values for the attribute;

for each of multiple of the identified attributes that are characteristic of the product, displaying, using a processing element, a graphical user interface that presents selectable indications of multiple different attribute levels for the attribute and that enables the respondent to provide feedback regarding the different attribute levels for the attribute, wherein:

the graphical user interface includes a region that is identified as corresponding to unacceptable attribute levels, a region that is identified as corresponding to a least-preferred attribute level, a region that is identified as corresponding to a most-preferred attribute level, and a region that is identified as corresponding to intermediately-preferred attribute levels, and the graphical user interface is configured to:

receive, from the respondent, an indication of a designation that an attribute level for the attribute is an unacceptable attribute level for the attribute by selecting the selectable indication of the attribute level and dragging the selectable indication of the attribute level to the region of the graphical user interface identified as corresponding to unacceptable attribute levels for the attribute, receive, from the respondent, an indication of a designation that an attribute level for the attribute is a least-preferred attribute level for the attribute by selecting the selectable indication of the attribute level and dragging the selectable indication of the attribute level to the region of the graphical user interface identified as corresponding to the least preferred attribute level for the attribute, receive, from the respondent, an indication of a designation that an attribute level for the attribute is an intermediately preferred attribute level for the attribute by selecting the selectable indication of the attribute level and dragging the selectable indication of the attribute level to the region of the graphical user interface identified as corresponding to intermediately preferred attribute levels for the attribute, and receive, from the respondent, an indication of a designation that an attribute level for the attribute is a most preferred attribute level for the attribute by selecting the selectable indication of the attribute level and dragging the selectable indication of the attribute level to the region of the graphical user interface identified as corresponding to the most preferred attribute level for the attribute;

for each of the multiple attributes, receiving, as a result of respondent interaction with the selectable indications of attribute levels for the attribute presented in the graphical user interface, respondent supplied designations for different attribute levels of the attribute, including at least a least-preferred attribute level for the attribute and a most-preferred attribute level for the attribute;

causing, using the processing element, the graphical user interface to request the respondent to identify, from among the multiple attributes, a group of attributes that represents attributes that are important to the respondent relative to other of the multiple attributes;

receiving, as a result of respondent interaction with the graphical user interface, indications of attributes, from among the multiple attributes, that the respondent identified as belonging to the group of attributes that are import ant to the respondent relative to other of the multiple attributes;

based on receiving the indications of attributes that the respondent identified as belonging to the group of attributes that are import ant to the respondent relative to other of the multiple attributes, sorting, using the processing element, the multiple attributes into at least two different piles of attributes, the different piles being disjoint and a particular one of the piles including the attributes that the respondent identified as belonging to the group of attributes that are important to the respondent relative to other of the multiple attributes;

causing, using the processing element, the graphical user interface to present to the respondent indications of the attributes belonging to the particular pile that includes the attributes that the respondent identified as belonging to the group of attributes that are important to the respondent relative to other of the multiple attributes and to request the respondent to provide a ranked order of the attributes belonging to the particular pile;

receiving, as a result of respondent interaction with the graphical user interface, an indication of a ranked order of the attributes belonging to the particular pile that includes the attributes that the respondent identified as belonging to the group of attributes that are important to the respondent relative to other of the multiple attributes;

based on receiving the indication of the ranked order of the attributes belonging to the particular pile that includes the attributes that the respondent identified as belonging to the group of attributes that are important to the respondent relative to other of the multiple attributes, identifying, using the processing element, a particular attribute as an attribute that is most important to the respondent;

for each attribute among a first subset of the attributes belonging to the particular pile that includes the attributes that the respondent identified as belonging to the group of attributes that are important to the respondent relative to other of the multiple attributes, the subset excluding the most important attribute to the respondent and one or more other attributes belonging to the particular pile that includes the attributes that the respondent identified as belonging to the group of attributes that are important to the respondent relative to other of the multiple attributes, causing, using the processing element, the graphical user interface to request the respondent to rate the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute level to the respondent;

for each attribute of the first subset of attributes, receiving, as a result of respondent interaction with the graphical user interface, an indication of the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute to the respondent;

for each attribute of the first subset of attributes, assigning, using the processing element, a relative importance value to the attribute based on the received indication of the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute to the respondent;

for each attribute among a second subset of attributes, the second subset of attributes including attributes that belong to the particular pile that includes the attributes that the respondent identified as belonging to the group of attributes that are important to the respondent relative to other of the multiple attributes but that are not included in the first subset of attributes and excluding the most important attribute to the respondent, assigning, using the processing element, a relative importance value to the attribute based on the ranking of the attribute within the ranked order of the attributes;

for each of at least some of the attribute levels of the attributes that belong to the particular pile that includes the attributes that the respondent identified as belonging to the group of attributes that are important to the respondent relative to other of the multiple attributes, calculating, using the processing element, a part worth value for the attribute level as a function of the respondent supplied designation for the attribute level and the relative importance value assigned to the attribute to which the attribute level corresponds; and causing, using the processing element, the graphical user interface to display at least one of the calculated part worth values.

2. The method of claim 1 further comprising:

defining the first subset of attributes to include, with the exception of the most important attribute to the respondent, some threshold percentage of the most highly ranked attributes within the ranked order of the attributes; and defining the second subset of attributes to include each of the remaining attributes that the respondent identified as belonging to the group of attributes that are important to the respondent relative to other of the multiple attributes but that are not within the threshold percentage of the most highly ranked attributes.

3. The method of claim 2, wherein:

defining the first subset of attributes to include, with the exception of the most important attribute to the respondent, some threshold percentage of the most highly ranked attributes within the ranked order of the attributes includes defining the first subset of attributes to include the top twenty percent of the ranked attributes within the ranked order of the attributes with the exception of the most important attribute to the respondent; and defining the second subset of attributes to include each of the remaining attributes that the respondent identified as belonging to the group of attributes that are important to the respondent relative to other of the multiple attributes but that are not within the threshold percentage of the most highly ranked attributes includes defining the second subset of attributes to include the bottom eighty percent of the ranked attributes within the ranked order of the attributes.

4. The method of claim 1, wherein:

causing, using the processing element and for each attribute among the first subset of attributes, the graphical user interface to request the respondent to rate the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute to the respondent and receiving, for each attribute of the first subset of attributes, an indication of the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute to the respondent includes:

establishing a pre-defined period of time for receiving indications of the importance of the difference between the respondent's least and most preferred attribute levels for corresponding attributes relative to the difference between the respondent's least and most preferred attribute levels for the most important attribute to the respondent, and causing the graphical user interface to request the respondent to rate the importance of the difference between the respondent's least and most preferred attribute levels for corresponding attributes that belong to the particular pile relative to the difference between the respondent's least and most preferred attribute level for the most important attribute to the respondent and receiving indications of the importance of the difference between the respondent's least and most preferred attribute levels for corresponding attributes that belong to the particular pile relative to the difference between the respondent's least and most preferred attribute levels for the most important attribute to the respondent until such time as a determination is made that the pre-defined period of time has expired; and assigning a relative importance value to each attribute among the second subset of attributes based on the ranking of the attribute within the ranked order of the attributes includes assigning a relative importance value to each attribute belonging to the particular pile for which an indication of the importance of the difference between the respondent's least and most preferred attribute levels for the attribute relative to the difference between the respondent's least and most preferred attribute levels for the most important attribute to the respondent was not received before determining that the pre-defined period of time expired with the exception of the most important attribute to the respondent.

5. The method of claim 1, wherein:
identifying, using the processing element, attributes that are characteristic of the product from the computer memory storage system includes identifying, using the processing element, a particular attribute and attribute levels for the particular attribute that have pre-defined desirability rankings within a pre-defined desirability hierarchy for the particular attribute;
receiving, for each of the multiple attributes, respondent supplied designations for different attributes levels of the attribute includes receiving an unacceptable attribute designation for an attribute level of the particular attribute; and
the method further comprises:
identifying attribute levels of the particular attribute that have lower desirability rankings within the pre-defined desirability hierarchy for the particular attribute than the respondent-designated unacceptable attribute level of the particular attribute, and
automatically and without respondent designation, designating as unacceptable attribute levels for the particular attribute the attribute levels for the particular attribute identified as having lower desirability rankings within the pre-defined desirability hierarchy for the particular attribute than the respondent-designated unacceptable attribute level for the particular attribute.

6. The method of claim 1, further comprising:
for each of the attribute levels of the multiple attributes for which respondent-supplied designations were received, assigning a quantifiable score to the attribute level based on the respondent-supplied designation for the attribute level, wherein calculating the part worth value for each of the at least some attribute levels includes multiplying the quantifiable score assigned to the attribute level based on the respondent-supplied designation for the attribute level by the relative importance value assigned to the attribute to which the attribute level corresponds.

7. A device comprising:
a processor; and
a storage device in communication with the processor and storing instructions adapted to be executed by the processor to:
access a computer memory storage system that stores information related to attributes that are characteristic of a type of product;
based on accessing the computer memory storage system, identify attributes that are characteristic of the product from the computer memory storage system, each of the attributes identified from the computer memory storage system having different attribute levels that reflect different possible values for the attribute;
for each of multiple of the identified attributes that are characteristic of the product, cause a display of a graphical user interface that presents selectable indications of multiple different attribute levels for the attribute and that enables the respondent to provide feedback regarding the different attribute levels for the attribute, wherein:
the graphical user interface includes a region that is identified as
corresponding to unacceptable attribute levels, a region that is identified as
corresponding to a least-preferred attribute level, a region that is identified as
corresponding to a most-preferred attribute level, and a region that is identified as
corresponding to intermediately-preferred attribute levels, and
the graphical user interface is configured to:
enable the respondent to designate an attribute level for the attribute as an unacceptable attribute level for the attribute by selecting the selectable indication of the attribute level and dragging the selectable indication of the attribute level to the region of the graphical user interface identified as corresponding to unacceptable attribute levels for the attribute,
enable the respondent to designate an attribute level for the attribute as a least-preferred attribute level for the attribute by selecting the selectable indication of the attribute level and dragging the selectable indication of the attribute level to the region of the graphical user interface identified as corresponding to the least preferred attribute level for the attribute,
enable the respondent to designate an attribute level for the attribute as an intermediately preferred attribute level for the attribute by selecting the selectable indication of the attribute level and dragging the selectable indication of the attribute level to the region of the graphical user interface identified as corresponding to intermediately preferred attribute levels for the attribute, and
enable the respondent to designate an attribute level for the attribute as a most preferred attribute level for the attribute by selecting the selectable indication of the attribute level and dragging the selectable indication of the attribute level to the region of the graphical user interface identified as corresponding to the most preferred attribute level for the attribute;
for each of the multiple attributes, receive, as a result of respondent interaction with the selectable indications of attribute levels for the attribute presented in the graphical user interface, respondent supplied designations for different attribute levels of the attribute, including at least a least-preferred attribute level for the attribute and a most-preferred attribute level for the attribute;
cause the graphical user interface to request the respondent to identify, from among the multiple attributes, a group of attributes that represents attributes that are import ant to the respondent relative to other of the multiple attributes;
receive, as a result of respondent interaction with the graphical user interface, indications of attributes, from among the multiple attributes, that the respondent identified as belonging to the group of attributes that are important to the respondent relative to other of the multiple attributes;
based on receiving the indications of attributes that the respondent identified as belonging to the group of attributes that are important to the respondent relative to other of the multiple attributes, sort the multiple attributes into at least two different piles of attributes, the different piles being disjoint and a particular one of the piles including the attributes that the respondent identified as belonging to the group of attributes that are important to the respondent relative to other of the multiple attributes;

cause the graphical user interface to present to the respondent indications of the attributes belonging to the particular pile that includes the attributes that the respondent identified as belonging to the group of attributes that important to the respondent relative to other of the multiple attributes and to request the respondent to provide a ranked order of the attributes belonging to the particular pile;

receive, as a result of respondent interaction with the graphical user interface, an indication of a ranked order of the attributes belonging to the particular pile that includes the attributes that the respondent identified as belonging to the group of attributes that are important to the respondent relative to other of the multiple attributes;

based on receiving the indication of the ranked order of the attributes belonging to the particular pile that includes the attributes that the respondent identified as belonging to the group of attributes that are important to the respondent relative to other of the multiple attributes, identify a particular attribute as an attribute that is most important to the respondent;

for each attribute among a first subset of the attributes belonging to the particular pile that includes the attributes that the respondent identified as belonging to the group of attributes that are important to the respondent relative to other of the multiple attributes, the subset excluding the most important attribute to the respondent and one or more other attributes belonging to the particular pile that includes the attributes that the respondent identified as belonging to the group of attributes that are important to the respondent relative to other of the multiple attributes, cause the graphical user interface to request the respondent to rate the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute level to the respondent;

for each attribute of the first subset of attributes, receive, as a result of respondent interaction with the graphical user interface, an indication of the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute to the respondent;

for each attribute of the first subset of attributes, assign a relative importance value to the attribute based on the received indication of the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute to the respondent;

for each attribute among a second subset of attributes, the second subset of attributes including attributes that belong to the particular pile that includes the attributes that the respondent identified as belonging to the group of attributes that are important to the respondent relative to other of the multiple attributes but that are not included in the first subset of attributes and excluding the most important attribute to the respondent, assign a relative importance value to the attribute based on the ranking of the attribute within the ranked order of the attributes;

for each of at least some of the attribute levels of the attributes that belong to the particular pile that includes the attributes that the respondent identified as belonging to the group of attributes that are important to the respondent relative to other of the multiple attributes, calculate a part worth value for the attribute level as a function of the respondent supplied designation for the attribute level and the relative importance value assigned to the attribute to which the attribute level corresponds; and cause the graphical user interface to display at least one of the calculated part worth values.

8. The device of claim 7, wherein the storage device further stores instructions adapted to be executed by the processor to:

define the first subset of attributes to include, with the exception of the most important attribute to the respondent, some threshold percentage of the most highly ranked attributes within the ranked order of the attributes; and define the second subset of attributes to include each of the remaining attributes that the respondent identified as belonging to the group of attributes that are important to the respondent relative to other of the multiple attributes but that are not within the threshold percentage of the most highly ranked attributes.

9. The device of claim 8, wherein:

the instructions adapted to be executed by the processor to define the first subset of attributes to include, with the exception of the most important attribute to the respondent, some threshold percentage of the most highly ranked attributes within the ranked order of the attributes include instructions adapted to be executed by the processor to define the first subset of attributes to include the top twenty percent of the ranked attributes within the ranked order of the attributes with the exception of the most important attribute to the respondent; and the instructions adapted to be executed by the processor to define the second subset of attributes to include each of the remaining attributes that the respondent identified as belonging to the group of attributes that are important to the respondent relative to other of the multiple attributes but that are not within the threshold percentage of the most highly ranked attributes include instructions adapted to be executed by the processor to define the second subset of attributes to include the bottom eighty percent of the ranked attributes within the ranked order of the attributes.

10. The device of claim 7, wherein:

the instructions adapted to be executed by the processor to cause, for each attribute among the first subset of attributes, the graphical user interface to request the respondent to rate the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute level to the respondent and to receive, for each attribute of the first subset of attributes, an indication of the importance of the difference between the respondent's least preferred attribute level for the attribute and the respondent's most preferred attribute level for the attribute relative to the difference between the respondent's least preferred attribute level for the most import ant attribute to the respondent and the respondent's most preferred attribute level for the most important attribute to the respondent include instructions adapted to be executed by the processor to:

establish a pre-defined period of time for receiving indications of the importance of the difference between the respondent's least and most preferred attribute levels for corresponding attributes relative to the difference between the respondent's least and most preferred attribute levels for the most important attribute to the respondent, and cause the graphical user interface to request the respondent to rate the importance of the difference between the respondent's least and most preferred attribute levels for corresponding attributes that belong to the particular pile relative to the difference between the respondent's least and most preferred attribute level for the most important attribute to the respondent and receive indications of the importance of the difference between the respondent's least and most preferred attribute levels for corresponding attributes that belong to the particular pile relative to the difference between the respondent's least and most preferred attribute levels for the most important attribute to the respondent until such time as a determination is made that the pre-defined period of time has expired; and the instructions adapted to be executed by the processor to assign a relative importance value to each attribute among the second subset of attributes based on the ranking of the attribute within the ranked order of the attributes include instructions adapted to be executed by the processor to assign a relative importance value to each attribute belonging to the particular pile for which an indication of the importance of the difference between the respondent's least and most preferred attribute levels for the attribute relative to the difference between the respondent's least and most preferred attribute levels for the most important attribute to the respondent was not received before determining that the pre-defined period of time expired with the exception of the most important attribute to the respondent.

11. The device of claim 7, wherein:
the instructions adapted to be executed by the processor to identify attributes that are characteristic of the product from the computer memory storage system include instructions that are adapted to be executed by the processor to identify a particular attribute and attribute levels for the particular attribute that have pre-defined desirability rankings within a pre-defined desirability hierarchy for the particular attribute;
the instructions adapted to be executed by the processor to receive, for each of the multiple attributes, respondent supplied designations for different attributes levels of the attribute include instructions adapted to be executed by the processor to receive an unacceptable attribute designation for an attribute level of the particular attribute; and the storage device further stores instructions adapted to be executed by the processor to:
identify attribute levels of the particular attribute that have lower desirability rankings within the pre-defined desirability hierarchy for the particular attribute than the respondent-designated unacceptable attribute level of the particular attribute, and
automatically and without respondent designation, designate as unacceptable attribute levels for the particular attribute the attribute levels for the particular attribute identified as having lower desirability rankings within the pre-defined desirability hierarchy for the particular attribute than the respondent-designated unacceptable attribute level for the particular attribute.

12. The device of claim 7, wherein:
the storage device further stores instructions adapted to be executed by the processor to assign, for each of the attribute levels of the multiple attributes for which respondent-supplied designations were received, a quantifiable score to the attribute level based on the respondent-supplied designation for the attribute level; and
the instructions adapted to be executed by the processor to calculate the part worth value for each of the at least some attribute levels include instructions adapted to be executed by the processor to multiply the quantifiable score assigned to the attribute level based on the respondent-supplied designation for the attribute level by the relative importance value assigned to the attribute to which the attribute level corresponds.

13. A computer-readable storage medium storing a computer program, the computer program including instructions that, when executed, cause a computer to:
access a computer memory storage system that stores information related to attributes that are characteristic of a type of product;
based on accessing the computer memory storage system, identify attributes that are characteristic of the product from the computer memory storage system, each of the attributes identified from the computer memory storage system having different attribute levels that reflect different possible values for the attribute;
for each of multiple of the identified attributes that are characteristic of the product, cause a display of a graphical user interface that presents selectable indications of multiple different attribute levels for the attribute and that enables the respondent to provide feedback regarding the different attribute levels for the attribute, wherein:
the graphical user interface includes a region that is identified as corresponding to unacceptable attribute levels, a region that is identified as corresponding to a least-preferred attribute level, a region that is identified as corresponding to a most-preferred attribute level, and a region that is identified as corresponding to intermediately-preferred attribute levels, and
the graphical user interface is configured to:
enable the respondent to designate an attribute level for the attribute as an unacceptable attribute level for the attribute by selecting the selectable indication of the attribute level and dragging the selectable indication of the attribute level to the region of the graphical user interface identified as corresponding to unacceptable attribute levels for the attribute, enable the respondent to designate an attribute level for the attribute as a least-preferred attribute level for the attribute by selecting the selectable indication of the attribute level and dragging the selectable indication of the attribute level to the region of the graphical user interface identified as corresponding to the least preferred attribute level for the attribute, enable the respondent to designate an attribute level for the attribute as an intermediately preferred attribute level for the attribute by selecting the selectable indication of the attribute level and dragging the selectable indication of the attribute level to the region of the graphical user interface identified as corresponding to intermediately preferred attribute levels for the attribute, and enable the respondent to designate an attribute level for the attribute as a most preferred attribute level for the attribute by selecting the selectable indication of the attribute level and dragging the selectable indication of the attribute level to the region of the graphical user interface identified as corresponding to the most preferred attribute level for the attribute;

for each of the multiple attributes, receive, as a result of respondent interaction with the selectable indications of attribute levels for the attribute presented in the graphical user interface, respondent supplied designations for different attribute levels of the attribute, including at least a least-preferred attribute level for the attribute and a most-preferred attribute level for the attribute;

cause the graphical user interface to request the respondent to identify, from among the multiple attributes, a group of attributes that represents attributes that are important to the respondent relative to other of the multiple attributes;

receive, as a result of respondent interaction with the graphical user interface, indications of attributes, from among the multiple attributes, that the respondent identified as belonging to the group of attributes that are important to the respondent relative to other of the multiple attributes;

based on receiving the indications of attributes that the respondent identified as belonging to the group of attributes that are import ant to the respondent relative to other of the multiple attributes, sort the multiple attributes into at least two different piles of attributes, the different piles being disjoint and a particular one of the piles including the attributes that the respondent identified as belonging to the group of attributes that are important to the respondent relative to other of the multiple attributes;

cause the graphical user interface to present to the respondent indications of the attributes belonging to the particular pile that includes the attributes that the respondent identified as belonging to the group of attributes that important to the respondent relative to other of the multiple attributes and to request the respondent to provide a ranked order of the attributes belonging to the particular pile;

receive, as a result of respondent interaction with the graphical user interface, an indication of a ranked order of the attributes belonging to the particular pile that includes the attributes that the respondent identified as belonging to the group of attributes that are important to the respondent relative to other of the multiple attributes;

based on receiving the indication of the ranked order of the attributes belonging to the particular pile that includes the attributes that the respondent identified as belonging to the group of attributes that are important to the respondent relative to other of the multiple attributes, identify a particular attribute as an attribute that is most important to the respondent;

for each attribute among a first subset of the attributes belonging to the particular pile that includes the attributes that the respondent identified as belonging to the group of attributes that are important to the respondent relative to other of the multiple attributes, the subset excluding the most important attribute to the respondent and one or more other attributes belonging to the particular pile that includes the attributes that the respondent identified as belonging to the group of attributes that are important to the respondent relative to other of the multiple attributes, cause the graphical user interface to request the respondent to rate the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute level to the respondent;

for each attribute of the first subset of attributes, receive, as a result of respondent interaction with the graphical user interface, an indication of the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute to the respondent;

for each attribute of the first subset of attributes, assign a relative importance value to the attribute based on the received indication of the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute to the respondent;

for each attribute among a second subset of attributes, the second subset of attributes including attributes that belong to the particular pile that includes the attributes that the respondent identified as belonging to the group of attributes that are important to the respondent relative to other of the multiple attributes but that are not included in the first subset of attributes and excluding the most important attribute to the respondent, assign a relative importance value to the attribute based on the ranking of the attribute within the ranked order of the attributes;

for each of at least some of the attribute levels of the attributes that belong to the particular pile that includes the attributes that the respondent identified as belonging to the group of attributes that are important to the respondent relative to other of the multiple attributes, calculate a part worth value for the attribute level as a function of the respondent supplied designation for the attribute level and the relative importance value assigned to the attribute to which the attribute level corresponds; and cause the graphical user interface to display at least one of the calculated part worth values.

14. The computer-readable storage medium of claim 13, wherein the computer program further includes instructions that, when executed, cause a computer to:

define the first subset of attributes to include, with the exception of the most important attribute to the respondent, some threshold percentage of the most highly ranked attributes within the ranked order of the attributes; and define the second subset of attributes to include each of the remaining attributes that the respondent identified as belonging to the group of attributes that are important to the respondent relative to other of the multiple attributes but that are not within the threshold percentage of the most highly ranked attributes.

15. The computer-readable medium of claim 14, wherein:

the instructions that, when executed, cause a computer to define the first subset of attributes to include, with the exception of the most important attribute to the respondent, some threshold percentage of the most highly ranked attributes within the ranked order of the attributes include instructions that, when executed, cause a computer to define the first subset of attributes to include the top twenty percent of the ranked attributes within the ranked order of the attributes with the exception of the most import ant attribute to the respondent; and the instructions that, when executed, cause a computer to define the second subset of attributes to include each of the remaining attributes that the respondent identified as belonging to the group of attributes that are import ant to the respondent relative to other of the multiple attributes but that are not within the threshold percentage of the most highly ranked attributes include instructions that, when executed, cause a computer to define the second subset of attributes to include the bottom eighty percent of the ranked attributes within the ranked order of the attributes.

16. The computer-readable medium of claim 13, wherein:

the instructions that, when executed, cause a computer to cause, for each attribute among the first subset of attributes, the graphical user interface to request the respondent to rate the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute level to the respondent and to receive, for each attribute of the first subset of attributes, an indication of the importance of the difference between the respondent's least preferred attribute level for the attribute and the respondent's most preferred attribute level for the attribute relative to the difference between the respondent's least preferred attribute level for the most important attribute to the respondent and the respondent's most preferred attribute level for the most important attribute to the respondent include instructions that, when executed, cause a computer to:

establish a pre-defined period of time for receiving indications of the importance of the difference between the respondent's least and most preferred attribute levels for corresponding attributes relative to the difference between the respondent's least and most preferred attribute levels for the most important attribute to the respondent, and cause the graphical user interface to request the respondent to rate the importance of the difference between the respondent's least and most preferred attribute levels for corresponding attributes that belong to the particular pile relative to the difference between the respondent's least and most preferred attribute level for the most import ant attribute to the respondent and receive indications of the importance of the difference between the respondent's least and most preferred attribute levels for corresponding attributes that belong to the particular pile relative to the difference between the respondent's least and most preferred attribute levels for the most important attribute to the respondent until such time as a determination is made that the pre-defined period of time has expired; and the instructions that, when executed, cause a computer to assign a relative importance value to each attribute among the second subset of attributes based on the ranking of the attribute within the ranked order of the attributes include instructions adapted to be executed by the processor to assign a relative importance value to each attribute belonging to the particular pile for which an indication of the importance of the difference between the respondent's least and most preferred attribute levels for the attribute relative to the difference between the respondent's least and most preferred attribute levels for the most important attribute to the respondent was not received before determining that the pre-defined period of time expired with the exception of the most important attribute to the respondent.

17. The computer-readable medium of claim 13, wherein:

the instructions that, when executed, cause a computer to identify attributes that are characteristic of the product from the computer memory storage system include instructions that are adapted to be executed by the processor to identify a particular attribute and attribute levels for the particular attribute that have pre-defined desirability rankings within a pre-defined desirability hierarchy for the particular attribute;

the instructions that, when executed, cause a computer to receive, for each of the multiple attributes, respondent supplied designations for different attributes levels of the attribute include instructions adapted to be executed by the processor to receive an unacceptable attribute designation for an attribute level of the particular attribute; and the computer program further includes instructions that, when executed, cause a computer to:

identify attribute levels of the particular attribute that have lower desirability rankings within the pre-defined desirability hierarchy for the particular attribute than the respondent-designated unacceptable attribute level of the particular attribute, and automatically and without respondent designation, designate as unacceptable attribute levels for the particular attribute the attribute levels for the particular attribute identified as having lower desirability rankings within the pre-defined desirability hierarchy for the particular attribute than the respondent-designated unacceptable attribute level for the particular attribute.

18. The computer-readable medium of claim 13, wherein:

the computer program further includes instructions that, when executed, cause a computer to assign, for each of the attribute levels of the multiple attributes for which respondent-supplied designations were received, a quantifiable score to the attribute level based on the respondent-supplied designation for the attribute level; and the instructions that, when executed, cause a computer to calculate the part worth value for each of the at least some attribute levels include instructions that, when executed, cause a computer to multiply the quantifiable score assigned to the attribute level based on the respondent-supplied designation for the attribute level by the relative importance value assigned to the attribute to which the attribute level corresponds.

* * * * *